(12) United States Patent
Ogawa

(10) Patent No.: US 6,268,969 B1
(45) Date of Patent: Jul. 31, 2001

(54) IMAGE FORMING OPTICAL SYSTEM HAVING DIFFRACTIVE OPTICAL ELEMENT

(75) Inventor: Hideki Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/289,722

(22) Filed: Apr. 12, 1999

(30) Foreign Application Priority Data

Apr. 14, 1998 (JP) .................................................. 10-120050

(51) Int. Cl.$^7$ .............................. G02B 13/02; G02B 9/64; G02B 9/62
(52) U.S. Cl. ............................ 359/745; 359/755; 359/757
(58) Field of Search ..................................... 359/745–748, 359/755–757, 763–764, 771–772, 784–785, 795, 558, 566, 569–571, 676, 683–684, 686–692

(56) References Cited

U.S. PATENT DOCUMENTS

| | | | |
|---|---|---|---|
| 4,852,984 | 8/1989 | Takahashi et al. | 359/748 |
| 4,871,243 | 10/1989 | Ogawa et al. | 359/754 |
| 5,042,927 | 8/1991 | Ogawa et al. | 359/683 |
| 5,241,421 | 8/1993 | Endo et al. | 359/684 |
| 5,528,427 | 6/1996 | Tanaka et al. | 359/683 |
| 5,537,259 | 7/1996 | Ogawa | 359/684 |
| 5,568,321 | 10/1996 | Ogawa et al. | 359/676 |
| 5,576,890 | 11/1996 | Tanaka et al. | 359/686 |
| 5,629,799 | 5/1997 | Maruyama et al. | 359/565 |
| 5,745,306 | * 4/1998 | Sato | 359/745 |
| 5,790,321 | 8/1998 | Goto | 359/742 |
| 5,790,902 | 8/1998 | Mizouchi et al. | 396/142 |
| 5,899,585 | 5/1999 | Ogawa | 396/72 |
| 5,930,043 | 7/1999 | Ogawa | 359/566 |

FOREIGN PATENT DOCUMENTS 6-324262  11/1994  (JP) .
6-331887  12/1994  (JP) .

* cited by examiner

Primary Examiner—Jordan M. Schwartz
(74) Attorney, Agent, or Firm—Fitzpatrick, Cella, Harper & Scinto

(57) ABSTRACT

An optical system includes, in order from an object side to an image side, a first lens unit having a positive refractive power and a second lens unit having a negative refractive power, the second lens unit being moved during focusing, wherein the first lens unit has a diffractive optical element of positive refractive power and a first lens subunit of positive refractive power, and the first lens subunit consists of at least one positive lens and at least one negative lens, the optical system satisfying the following conditions:

$$0.005 < \phi_D/\phi_{1a} < 0.05$$

$$50 < \nu_{1ap} < 75$$

$$25 < \nu_{1an} < 60$$

where $\phi_D$: a refractive power of the diffractive optical element of positive refractive power in the first lens unit, $\phi_{1a}$: a refractive power of the first lens subunit, $\nu_{1ap}$: an Abbe number of a material of the positive lens, or a mean value of Abbe numbers of materials of positive lenses, included in the first lens subunit, and $\nu_{1an}$: an Abbe number of a material of the negative lens, or a mean value of Abbe numbers of materials of negative lenses, included in the first lens subunit.

12 Claims, 23 Drawing Sheets

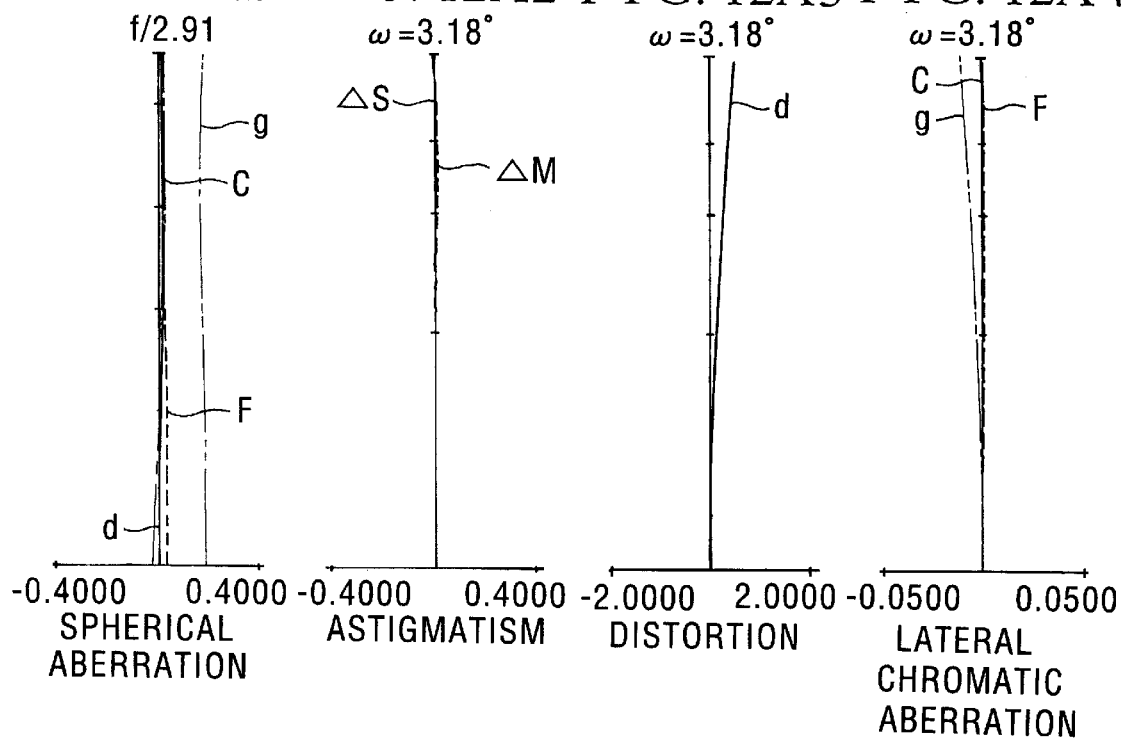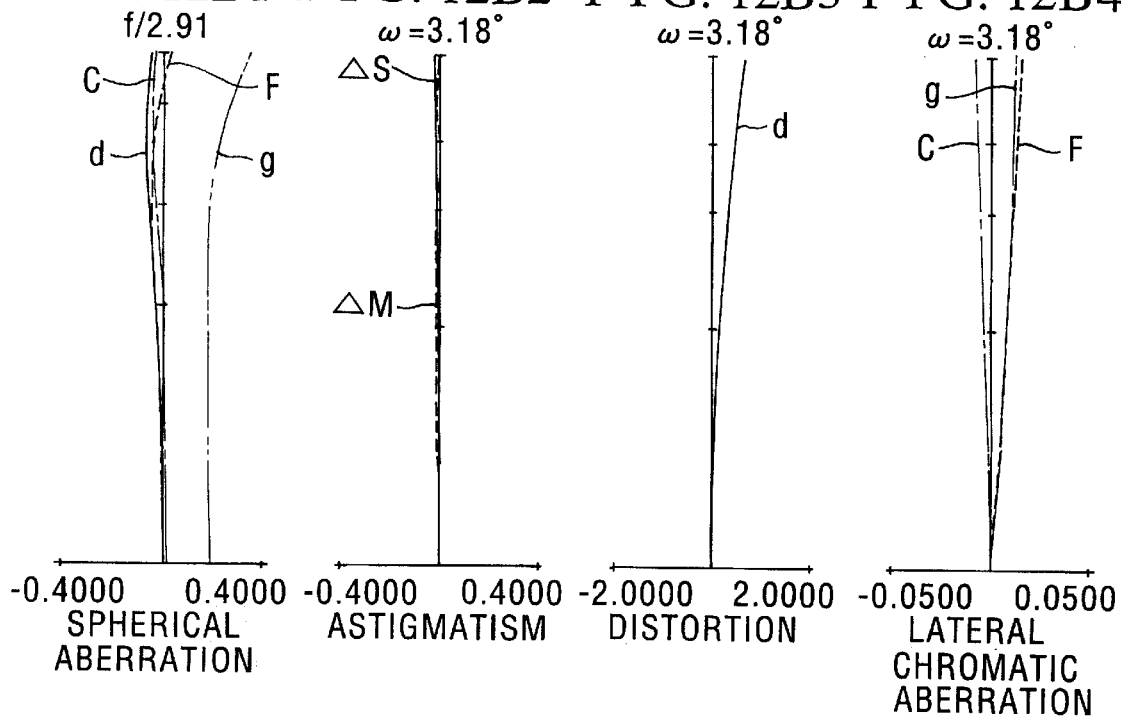

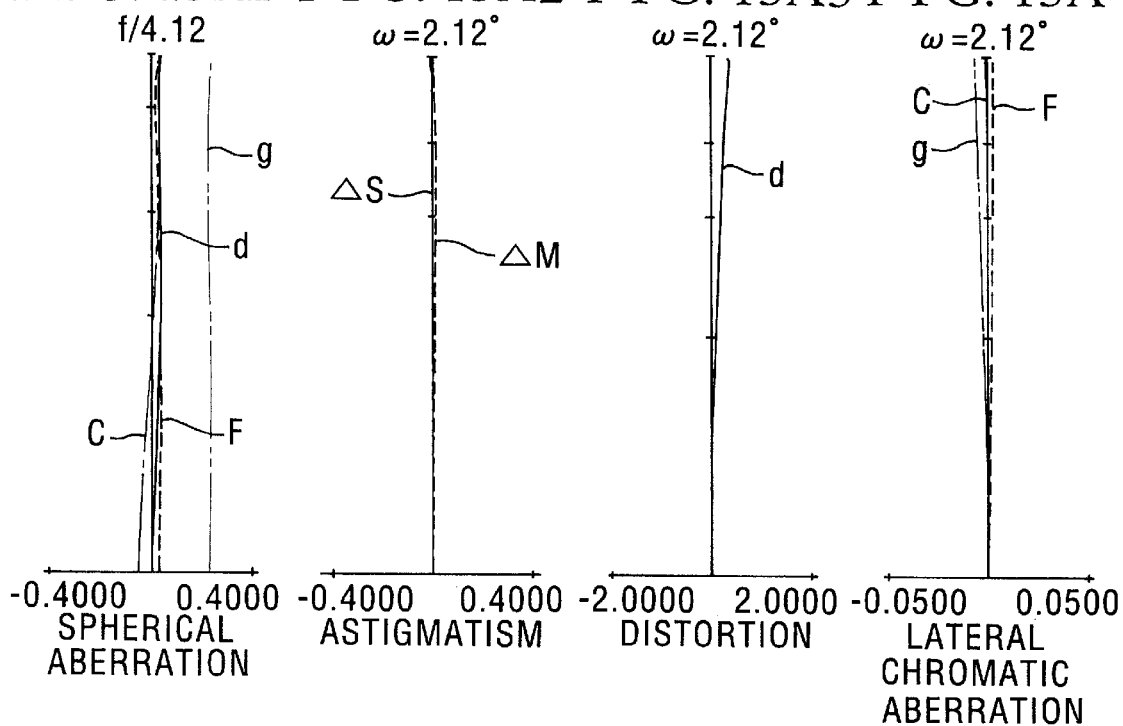
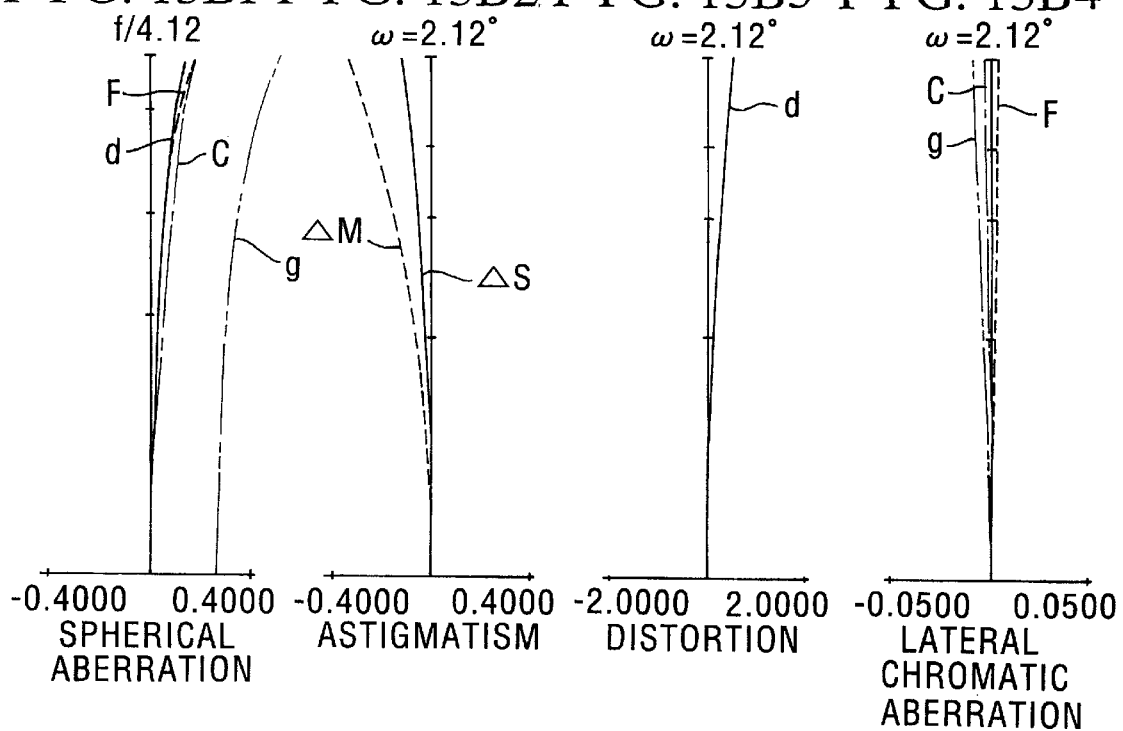

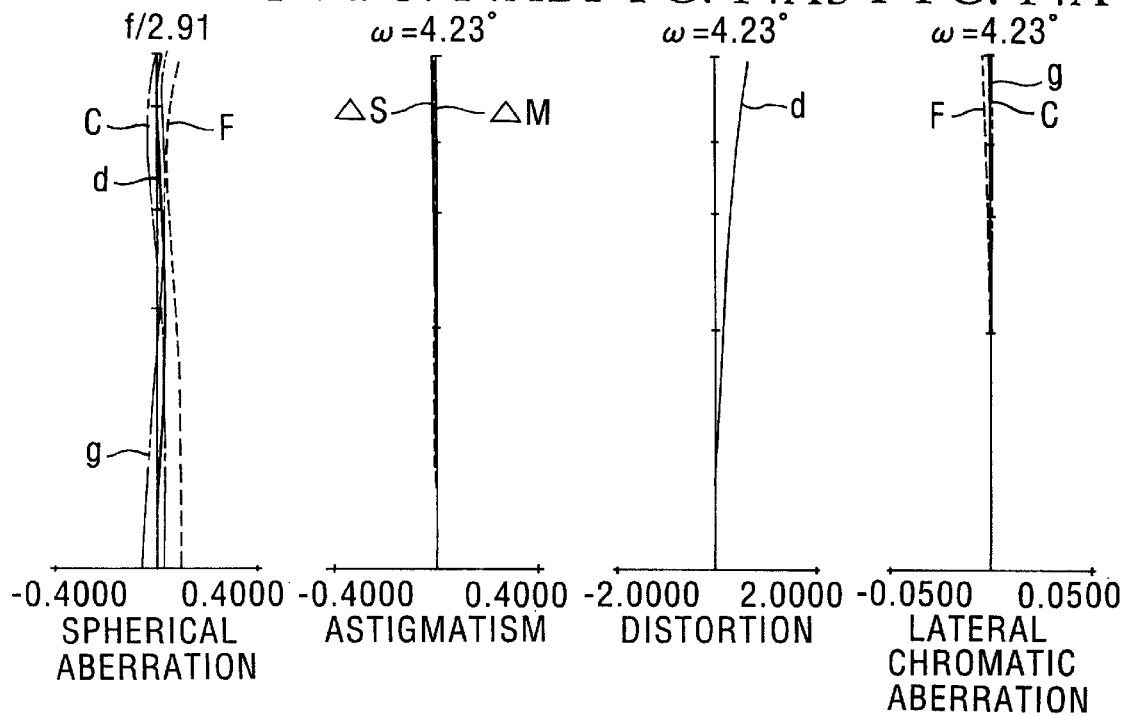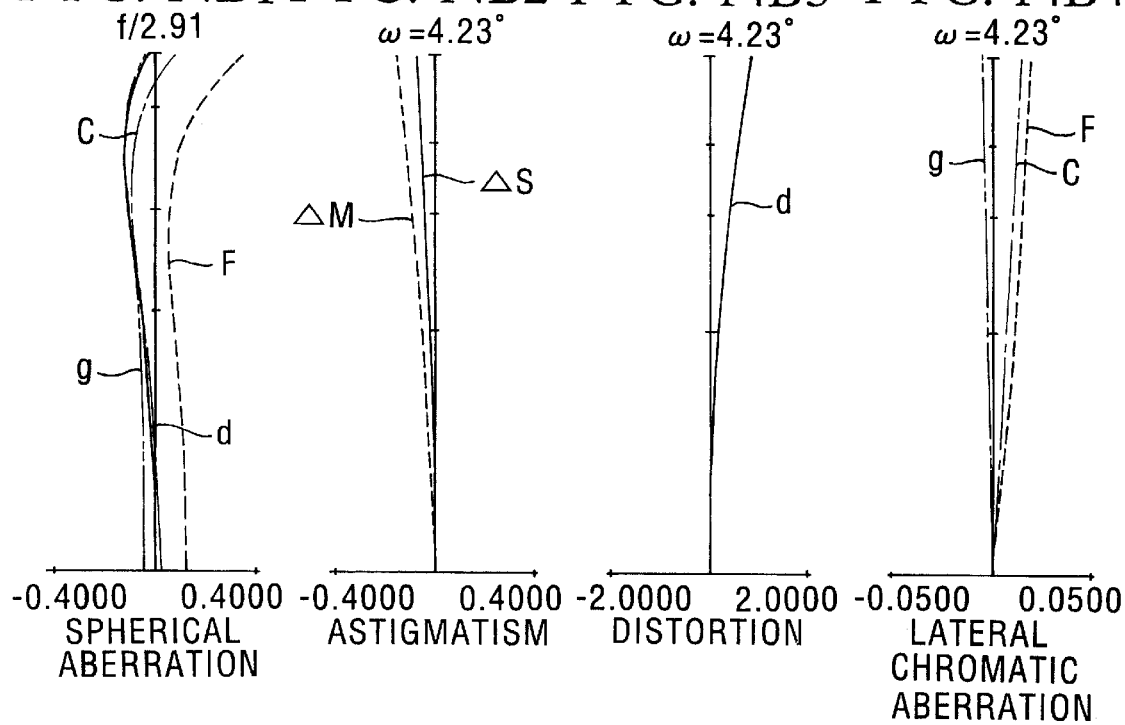

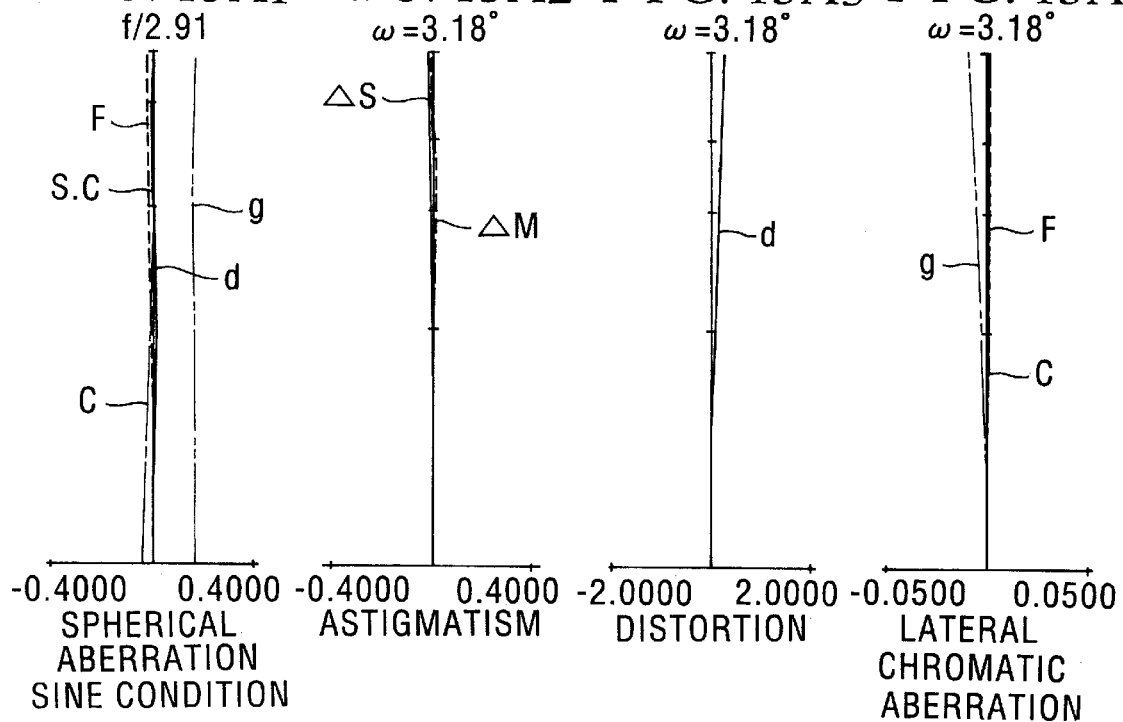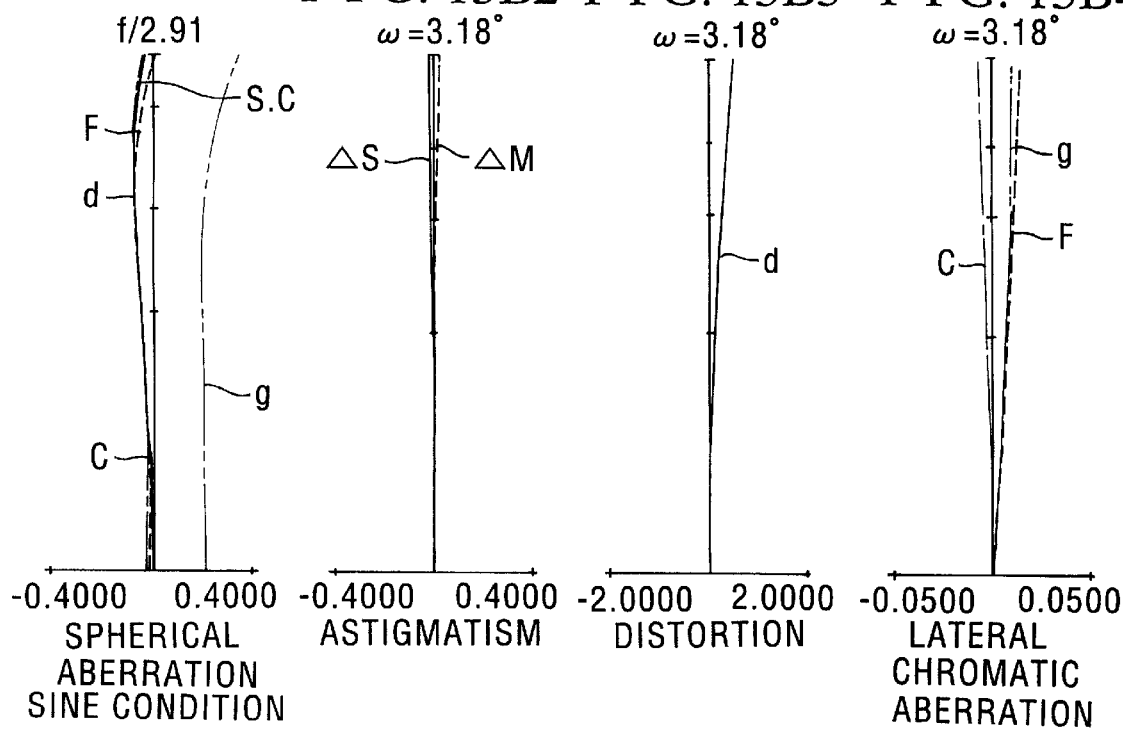

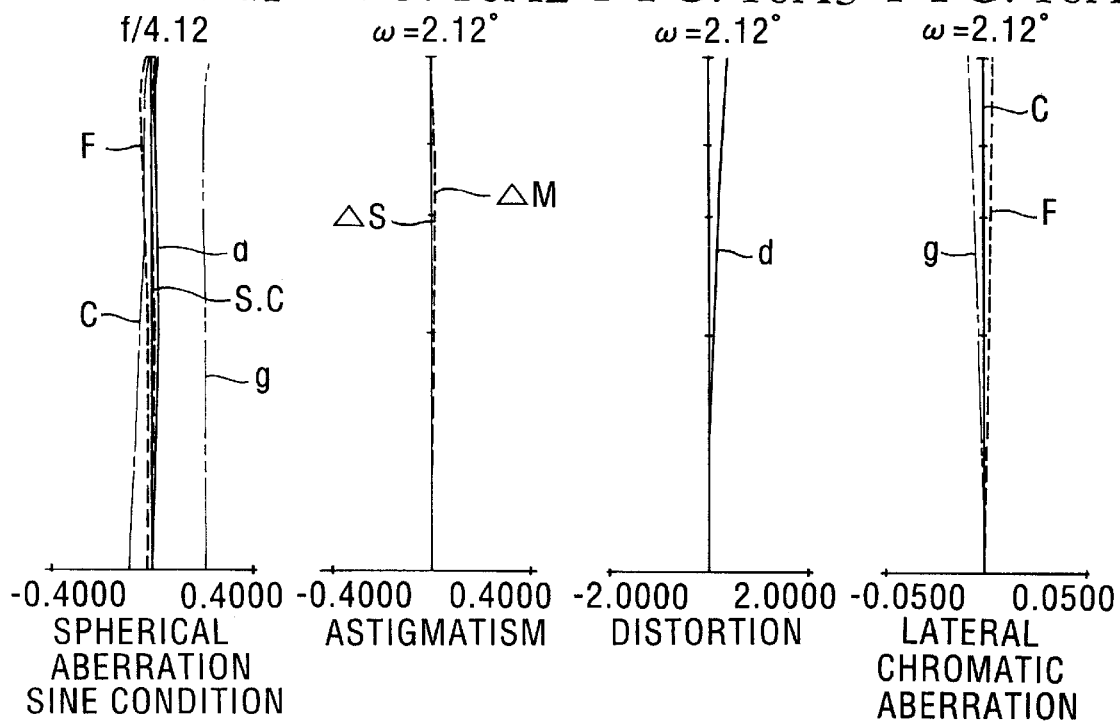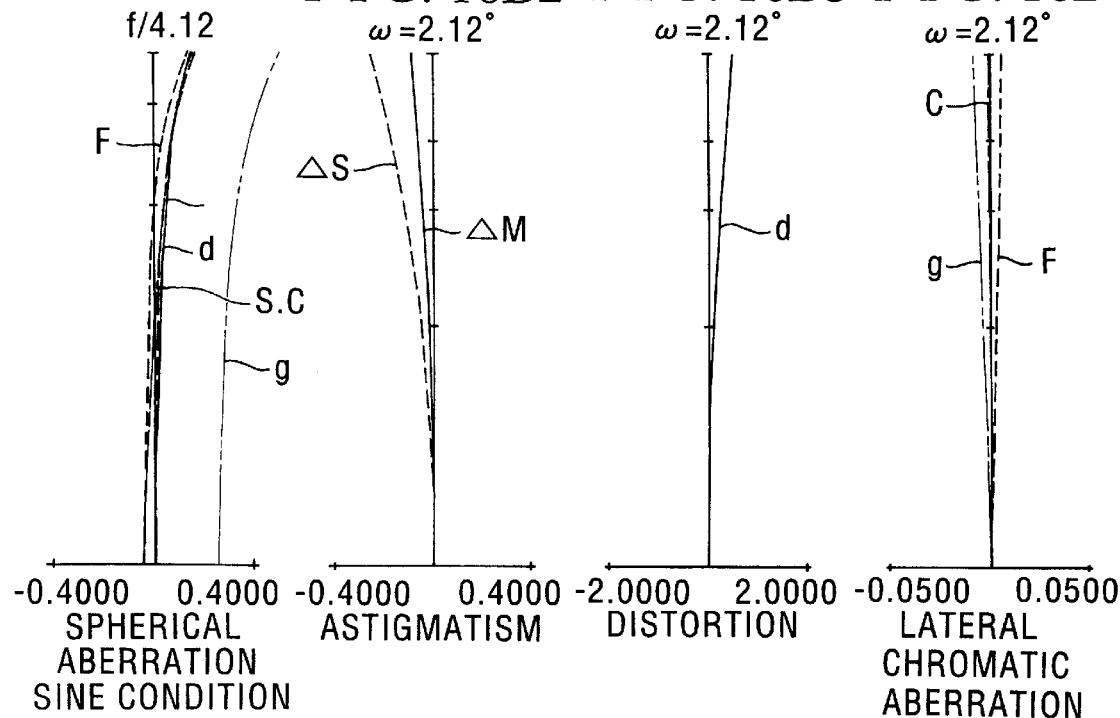

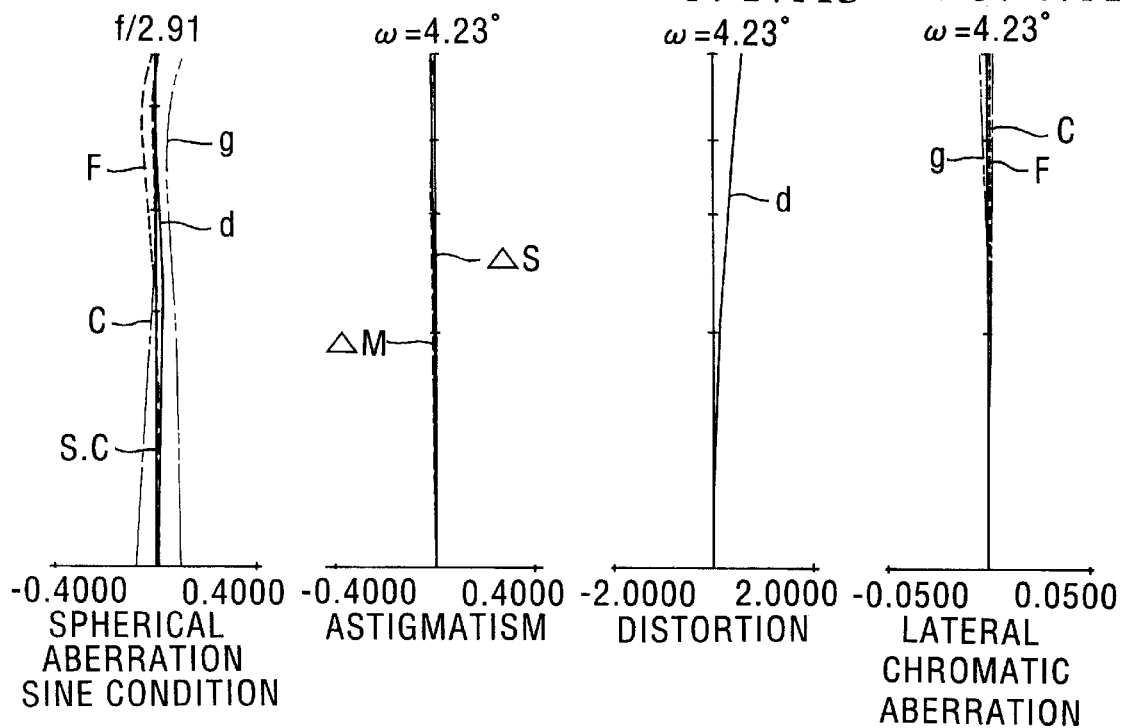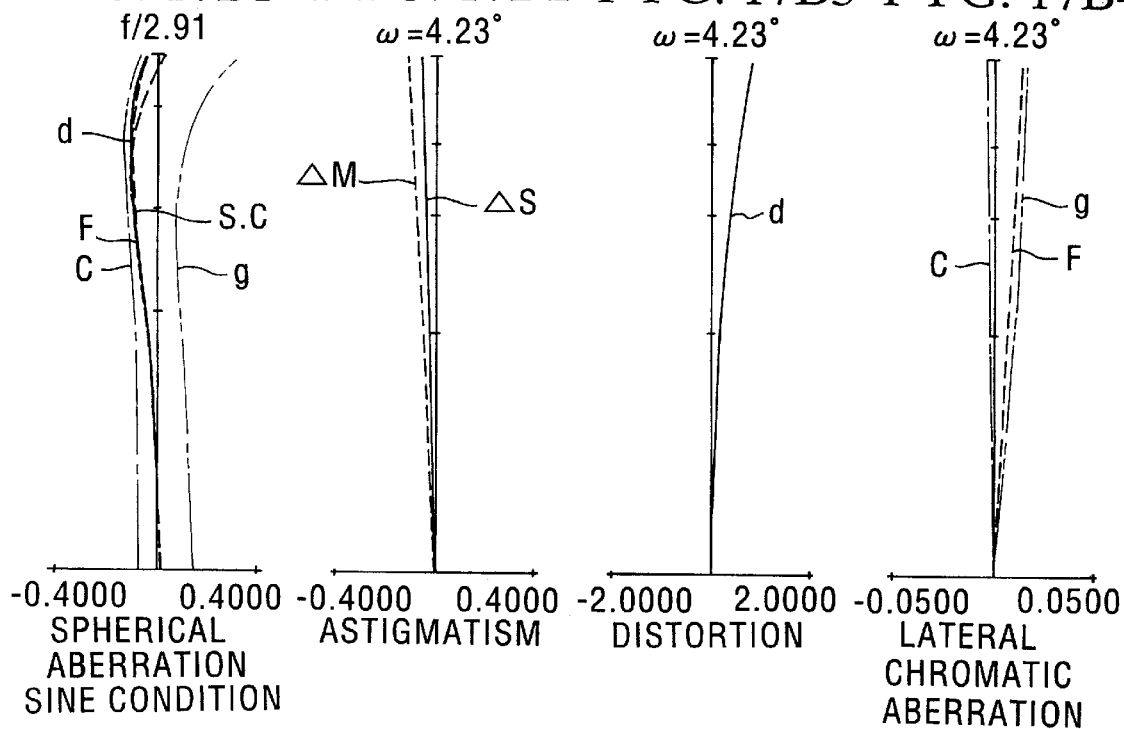

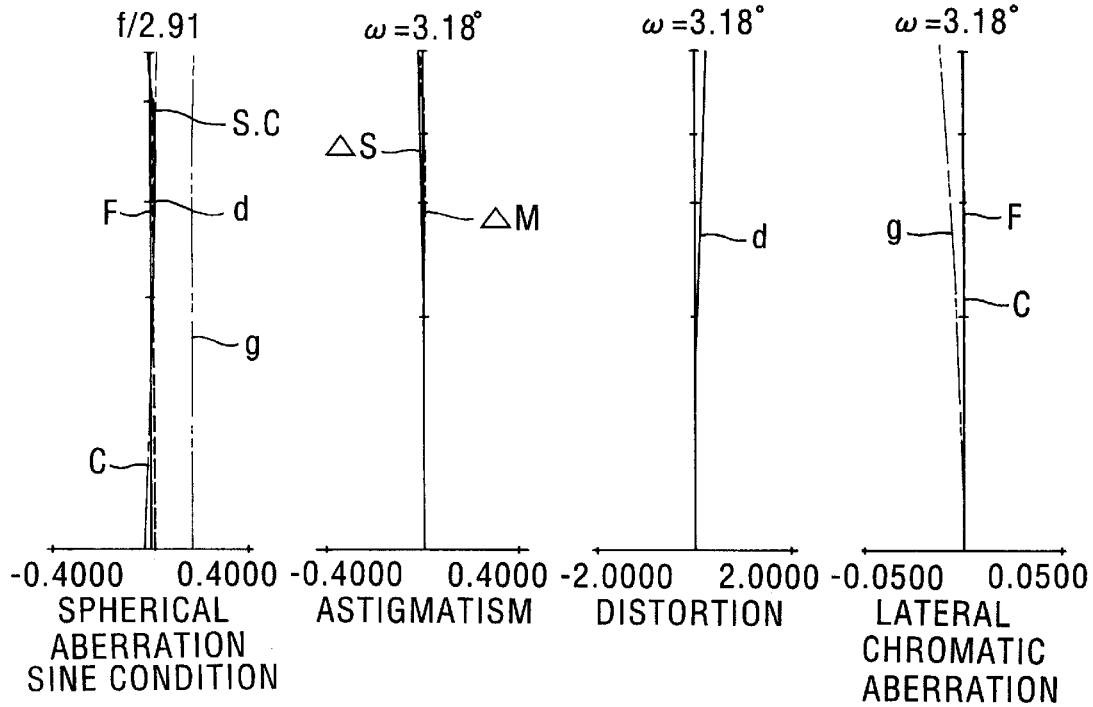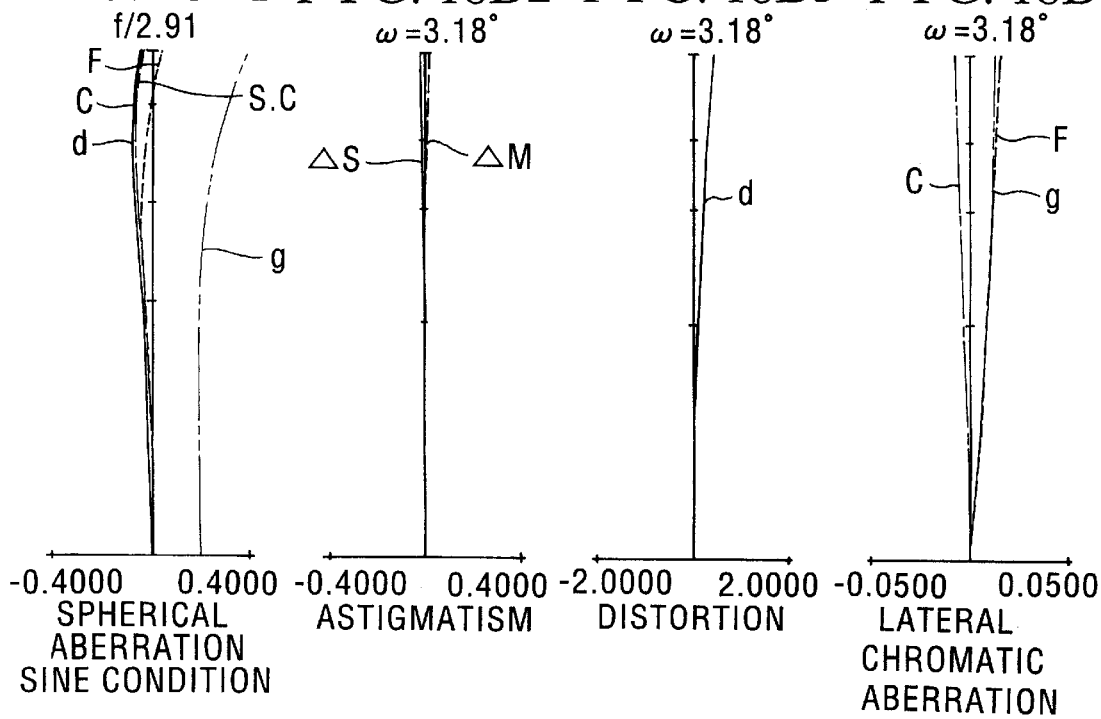

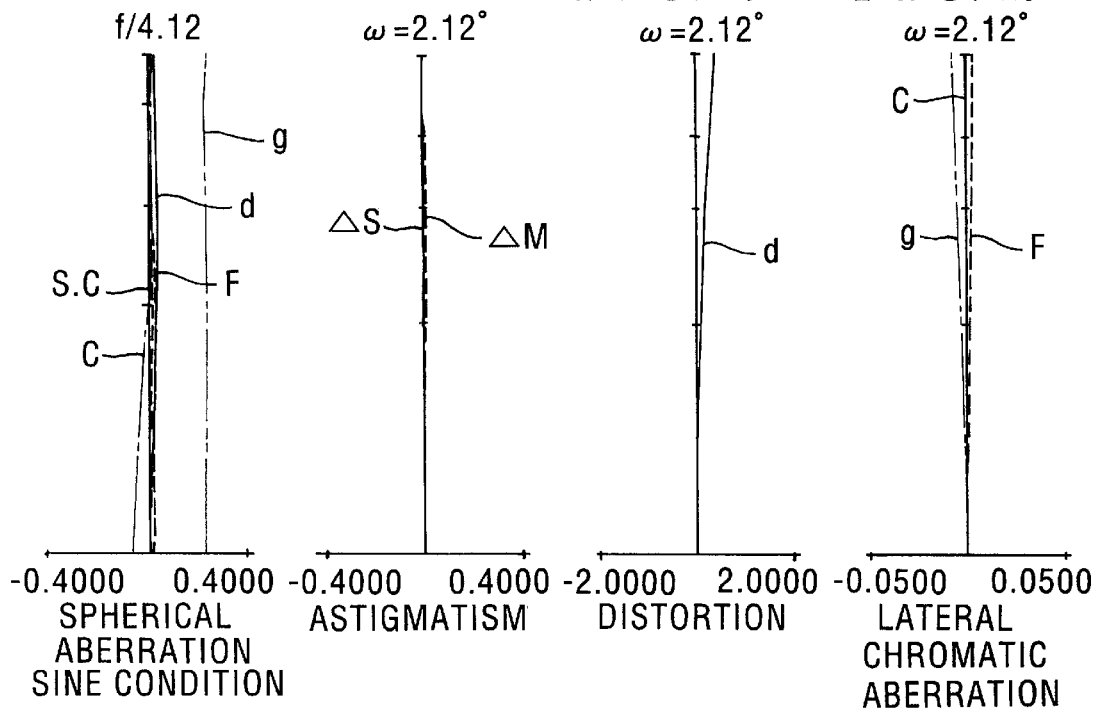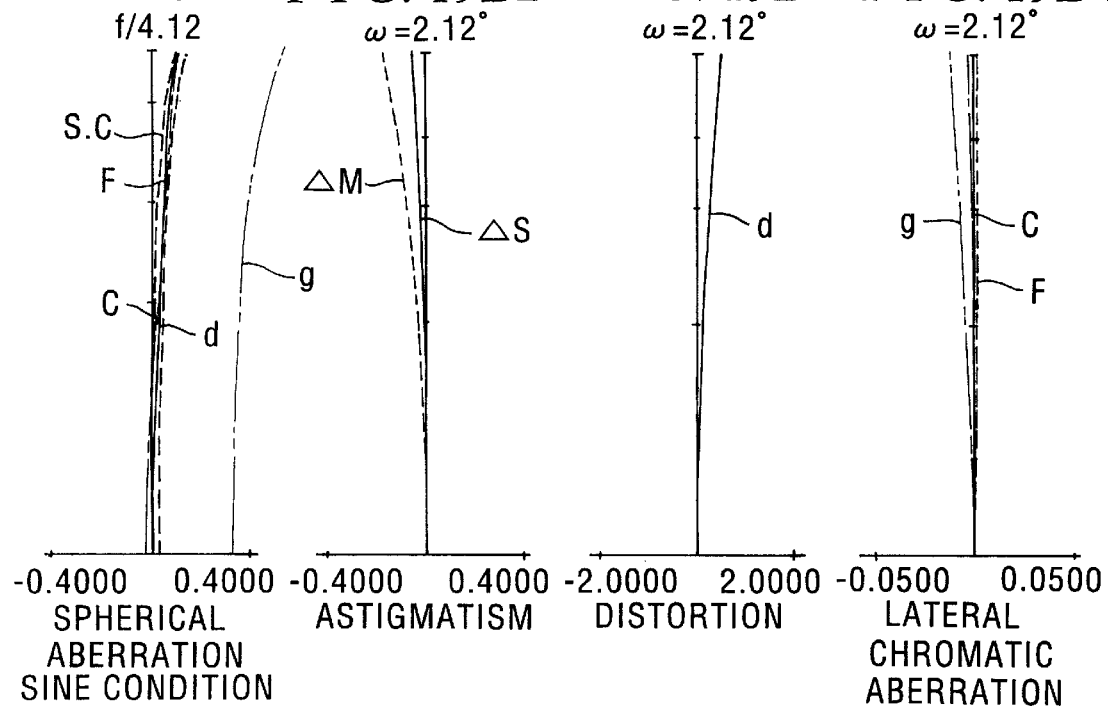

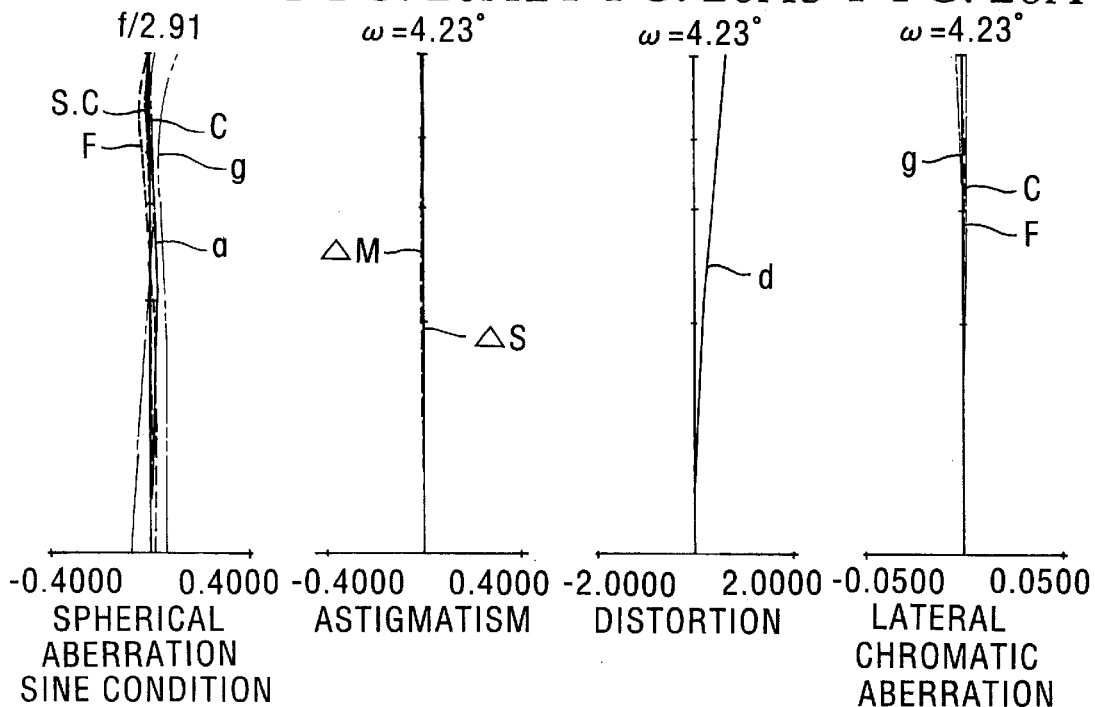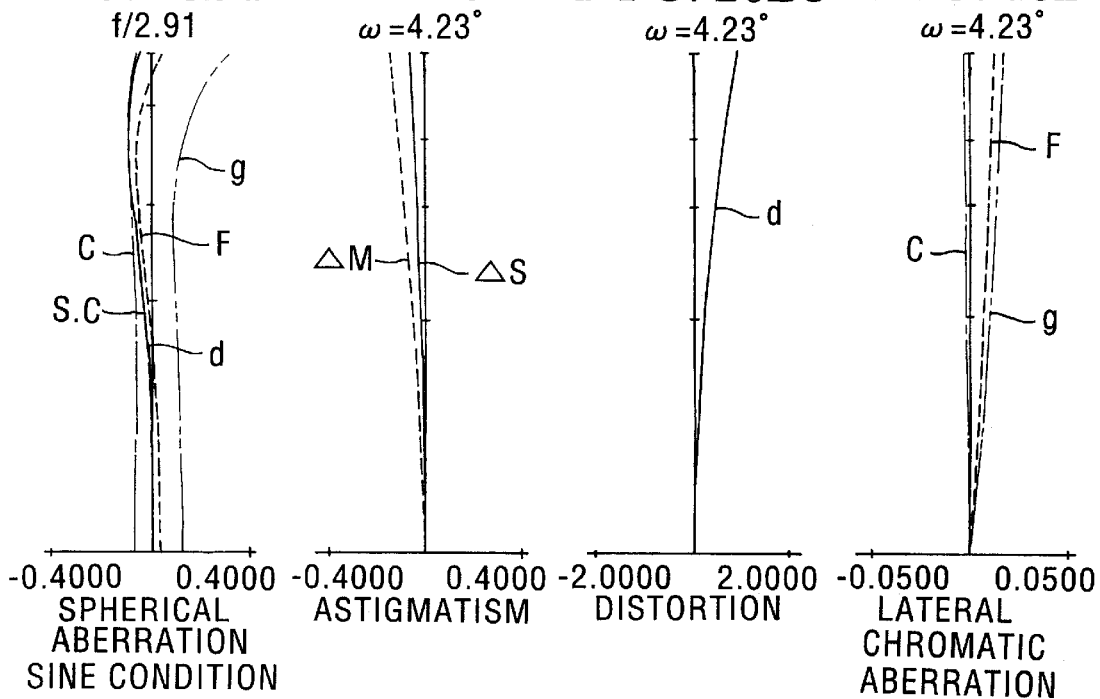

IMAGE FORMING OPTICAL SYSTEM HAVING DIFFRACTIVE OPTICAL ELEMENT

BACKGROUND OF THE INVENTION

Field of the Invention

The present invention relates to an image forming optical system having a diffractive optical element and, more particularly, to a photographic optical system of the telephoto type having a large relative aperture with a refractive optical element and a diffractive optical element used in combination to improve imaging performance, suited to silver-halide photographic cameras, video cameras, electronic still cameras, etc.

Description of Related Art

In general, in long-focal-length or telephoto lenses, as the focal length becomes longer, various aberrations, especially, longitudinal chromatic aberration and lateral chromatic aberration, tend to worsen. To correct these chromatic aberrations, there has been a previous proposal for combining a positive lens made of a low-dispersion material, which has an extraordinary partial dispersion, such as fluorite, with a negative lens made of a high dispersion material, so as to obtain achromatism. Such a method has found its use in many telephoto lenses.

Optical glasses of extraordinary partial dispersion such as fluorite are advantageous for correcting chromatic aberrations, but have a disadvantage that they are very expensive. In specific gravity, too, they are relatively greater than the other low-dispersion glasses whose partial dispersions are not extraordinary. Therefore, the use of fluorite leads also to a drawback that the whole lens system becomes heavier. (For example, fluorite is 3.18 and FK01 is 3.63 in specific gravity. In contrast, FK5 that has a small extraordinary partial dispersion is 2.46 and BK7 is 2.52 in specific gravity.) Moreover, the extraordinary partial dispersion glass surface is relatively susceptible to scratches. Further, FK01 or the like, when made in the form of large relative aperture lenses, gives rise to another drawback that these lenses are liable to crack when the ambient temperature changes rapidly.

Telephoto lenses in which chromatic aberration is corrected only by using a glass having no extraordinary partial dispersion have been proposed in Japanese Laid-Open Patent Applications No. Hei 6-324262 and No. Hei 6-331887.

The telephoto lens disclosed in the above Japanese Laid-Open Patent Application No. Hei 6-324262 is composed of at least one diffractive optical element having a positive refractive power, at least one refractive optical element having a positive refractive power, and at least one refractive optical element having a negative refractive power, has an F-number of F2.8 or thereabout and is corrected relatively well for chromatic aberration. Also, the telephoto lens disclosed in the above Japanese Laid-Open Patent Application No. Hei 6-331887 is composed of a combination of a diffractive optical element and refractive optical elements, has an F-number of F2.8 or thereabout and is corrected relatively well for chromatic aberration.

In telephoto lenses adapted to be mounted on cameras having the automatic focusing function, which are extensively being developed in recent years, it has become general that focusing is effected by moving along an optical axis a lens unit disposed in a relatively rear portion, which is light in weight and provides little load on the lens barrel.

In a case where, in the photographic optical system disclosed in the above Japanese Laid-Open Patent Application No. Hei 6-324262, focusing is made to be effected by moving a rear lens unit, various aberrations including chromatic aberration become worse. Therefore, such a photographic optical system is difficult to use as a telephoto lens adapted for cameras having the automatic focusing function.

Further, in the optical system of the telephoto lens disclosed in the above Japanese Laid-Open Patent Application No. Hei 6-331887, as shown in FIG. 10 or FIG. 12 thereof, there is provided, as a lens unit that is relatively light in weight and has relatively little variation of monochromatic aberration during focusing, a lens unit disposed slightly in the rear (image side) of the middle point of the optical system and that consists of a cemented lens composed of a positive lens and a negative lens and having a negative refractive power as a whole. However, such a telephoto lens is not necessarily sufficient for the distribution of refractive power between the diffraction surface (diffractive optical element) and the refractive optical element and for setting of glass materials. Therefore, if the above negative lens unit is used for focusing, the variation of chromatic aberration becomes large.

BRIEF SUMMARY OF THE INVENTION

An object of the invention is to provide an image forming optical system, such as a telephoto lens, which is capable of making chromatic aberrations sufficiently small.

Another object of the invention is to provide an image forming optical system, such as a telephoto lens, whose chromatic aberrations vary to a small extent with focusing.

To attain the above objects, in accordance with an aspect of the invention, there is provided an optical system that comprises, in order from an object side to an image side, a first lens unit having a positive refractive power and a second lens unit having a negative refractive power, the second lens unit being moved during focusing, wherein the first lens unit has a diffractive optical element of positive refractive power and a first lens subunit of positive refractive power, and the first lens subunit comprsises at least one positive lens and at least one negative lens, the optical system satisfying the following conditions:

$$0.005 < \phi_D/\phi_{1a} < 0.05 \quad (1)$$

$$50 < \nu_{1ap} < 75 \quad (2)$$

$$25 < \nu_{1an} < 60 \quad (3)$$

where $\phi_D$: the refractive power of the diffractive optical element of positive refractive power in the first lens unit, $\phi_{1a}$: the refractive power of the first lens subunit, $\nu_{1ap}$: the Abbe number of a material of the positive lens, included in the first lens subunit when there is only one positive lens in the first lens subunit or the mean value of Abbe numbers of materials of positive lenses, included in the first lens subunit included in the first lens subunit when there is more than one positive lens in the first lens subunit, and $\nu_{1an}$: the Abbe number of a material of the negative lens included in the first lens subunit when there is only one negative lens in the firs lens subunit, or the mean value of Abbe numbers of materials of negative lenses, included in the first lens subunit when there is more than one negative lens in the first lens subunit.

In accordance with another aspect of the invention, there is provided an optical system that comprises, in order from an object side to an image side, a first lens unit having a positive refractive power and a second lens unit having a negative refractive power, the second lens unit being moved toward the image side along an optical axis during focusing from an infinitely distant object to a closest object, wherein the first lens unit has a diffractive optical element of positive refractive power composed of a diffraction grating of revolution symmetry with respect to the optical axis and a first lens subunit of positive refractive power, and the first lens subunit consists of at least one positive lens and at least one negative lens, the optical system satisfying the following conditions:

$$0.005 < \phi_D/\phi_{1a} < 0.05$$

$$50 < \nu_{1ap} < 75$$

$$25 < \nu_{1an} < 60$$

where $\phi_D$: the refractive power of the diffractive optical element of positive refractive power in the first lens unit, $\phi_{1a}$: the refractive power of the first lens subunit, $\nu_{1ap}$: then Abbe number of a material of the positive lens, or the mean value of Abbe numbers of materials of positive lenses, included in the first lens subunit included in the first lens subunit when there is more than one positive lens in the first lens subunit, and $\nu_{1an}$: the Abbe number of a material of the negative lens included in the first lens subunit when there is only one negative lens in the first lens subunit, or the mean value of Abbe numbers of materials of negative lenses, included in the first lens subunit when there is more than one negative lens in the first lens subunit.

In accordance with a further aspect of the invention, the optical system further satisfies the following condition:

$$0.5 < \phi_{1a}/\phi < 5$$

where $\phi$ is a refractive power of the entirety of the optical system.

In accordance with a further aspect of the invention, the second lens unit has one positive lens and one negative lens, and the optical system further satisfies the following conditions:

$$-5 < \phi_2/\phi < -1$$

$$20 < \nu_{2p} < 30$$

$$30 < \nu_{2n} < 50$$

where $\phi$: the refractive power of the entirety of the optical system, $\phi_2$: the refractive power of the second lens unit, $\nu_{2p}$: the Abbe number of a material of the positive lens included in the second lens unit, and $\nu_{2n}$: the Abbe number of a material of the negative lens included in the second lens unit.

In accordance with a further aspect of the invention, the first lens subunit consists of, in order from the object side to the image side, a positive lens, a positive lens and a negative lens.

In accordance with a further aspect of the invention, the first lens unit has a negative lens of meniscus form concave toward the image side disposed on the image side of the first lens subunit.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 12A1 to 12A4 and FIGS. 12B1 to 12B4 are graphic representations of the longitudinal aberrations of the numerical example 1 of the invention during focusing for an infinite distance and during focusing for an object distance of 4 meters, respectively.

FIGS. 13A1 to 13A4 and FIGS. 13B1 to 13B4 are graphic representations of the longitudinal aberrations of the numerical example 2 of the invention during focusing for an infinite distance and during focusing for an object distance of 6 meters, respectively.

FIGS. 14A1 to 14A4 and FIGS. 14B1 to 14B4 are graphic representations of the longitudinal aberrations of the numerical example 3 of the invention during focusing for an infinite distance and during focusing for an object distance of 3 meters, respectively.

FIGS. 15A1 to 15A4 and FIGS. 15B1 to 15B4 are graphic representations of the longitudinal aberrations of the numerical example 4 of the invention during focusing for an infinite distance and during focusing for an object distance of 4 meters, respectively.

FIGS. 16A1 to 16A4 and FIGS. 16B1 to 16B4 are graphic representations of the longitudinal aberrations of the numerical example 5 of the invention during focusing for an infinite distance and during focusing for an object distance of 6 meters, respectively.

FIGS. 17A1 to 17A4 and FIGS. 17B1 to 17B4 are graphic representations of the longitudinal aberrations of the numerical example 6 of the invention during focusing for an infinite distance and during focusing for an object distance of 3 meters, respectively.

FIGS. 18A1 to 18A4 and FIGS. 18B1 to 18B4 are graphic representations of the longitudinal aberrations of the numerical example 7 of the invention during focusing for an infinite distance and during focusing for an object distance of 4 meters, respectively.

FIGS. 19A1 to 19A4 and FIGS. 19B1 to 19B4 are graphic representations of the longitudinal aberrations of the numerical example 8 of the invention during focusing for an infinite distance and during focusing for an object distance of 6 meters, respectively.

FIGS. 20A1 to 20A4 and FIGS. 20B1 to 20B4 are graphic representations of the longitudinal aberrations of the numerical example 9 of the invention during focusing for an infinite distance and during focusing for an object distance of 3 meters, respectively.

DETAILED DESCRIPTION OF THE INVENTION

Hereinafter, preferred embodiments of the invention will be described in detail with reference to the drawings.

Figure 1:
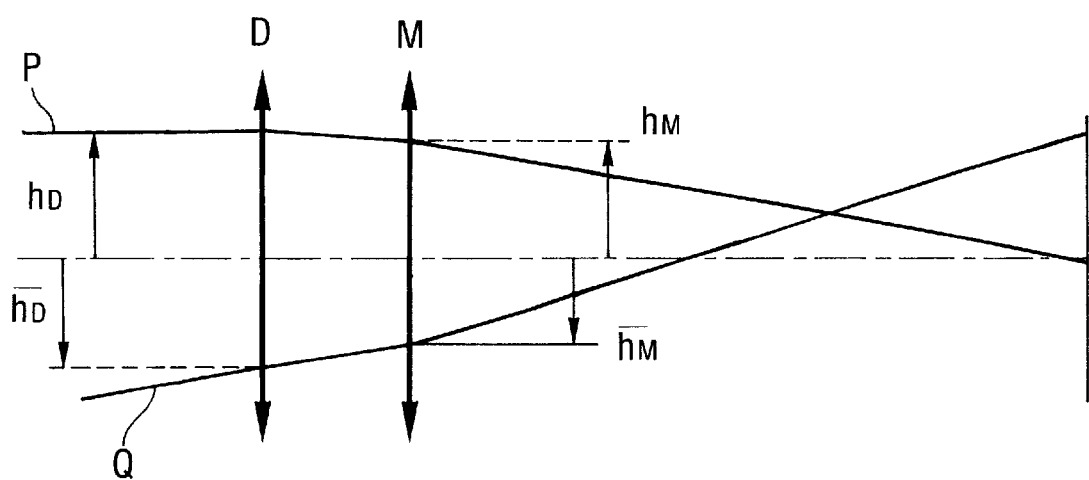
FIG. 1 is a schematic diagram of the paraxial arrangement of an optical system, for explaining the principles of the invention.

Referring to FIG. 1, an optical system having a diffractive optical element according to the invention is illustrated as a thin system with the paraxial refractive power arrangement shown to explain optical actions in the normal state. In the present embodiment, the optical system takes the form of a telephoto lens, comprising a refractive optical system part M and a diffractive optical element having a diffraction grating formed in a surface D thereof. P represents a paraxial on-axial ray of light, and Q represents a pupil paraxial ray of light. (Here, for the purpose of simply treating problems, the diffraction surface D is assumed to be disposed on the object side of the refractive optical system part M, and the refractive optical system part M is considered as a thin single lens.)

Figure 2A:
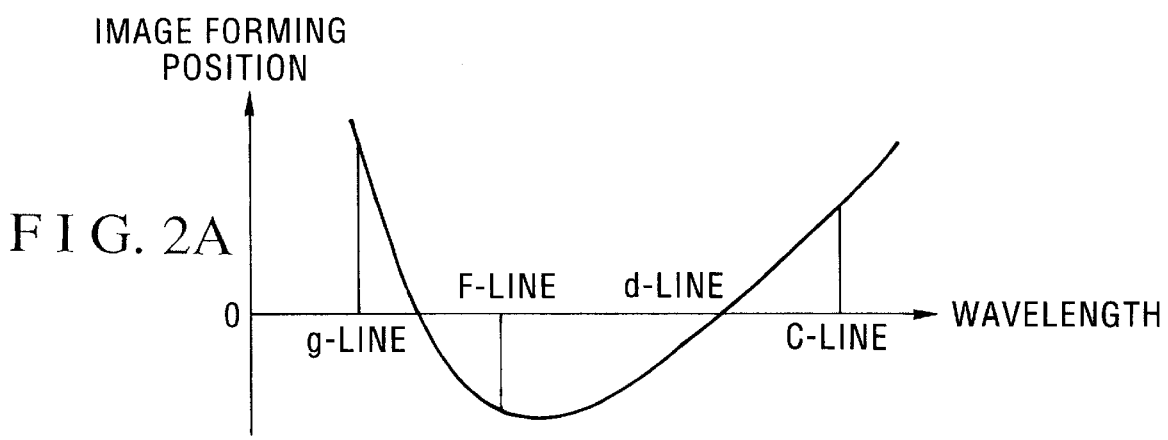
FIGS. 2A, 2B and 2C are graphs for explaining the correction of chromatic aberrations in the invention.
Figure 2B:
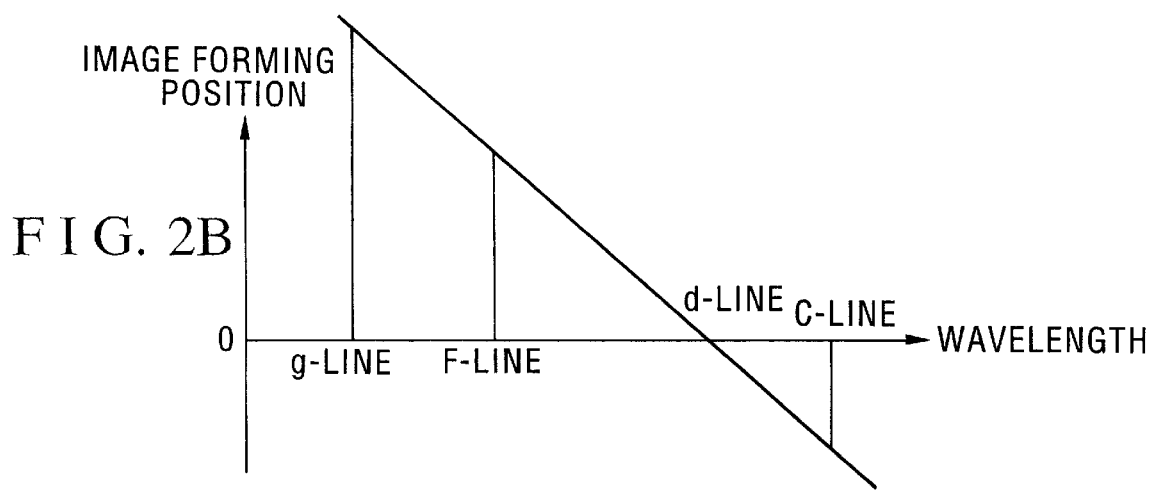
Figure 2C:
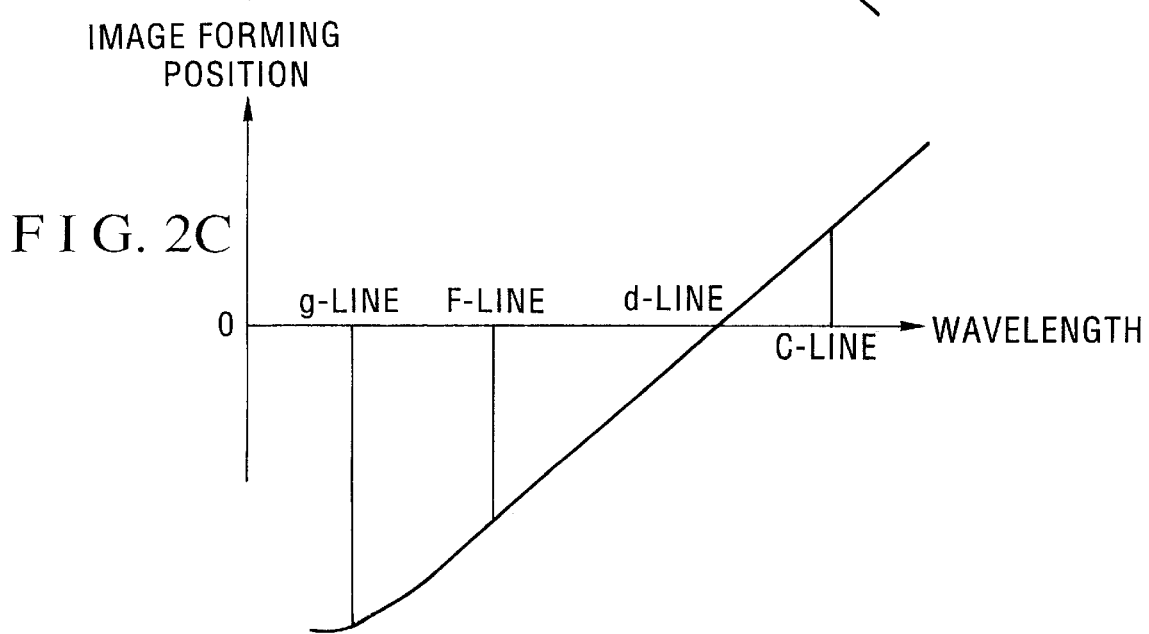
Figure 3:
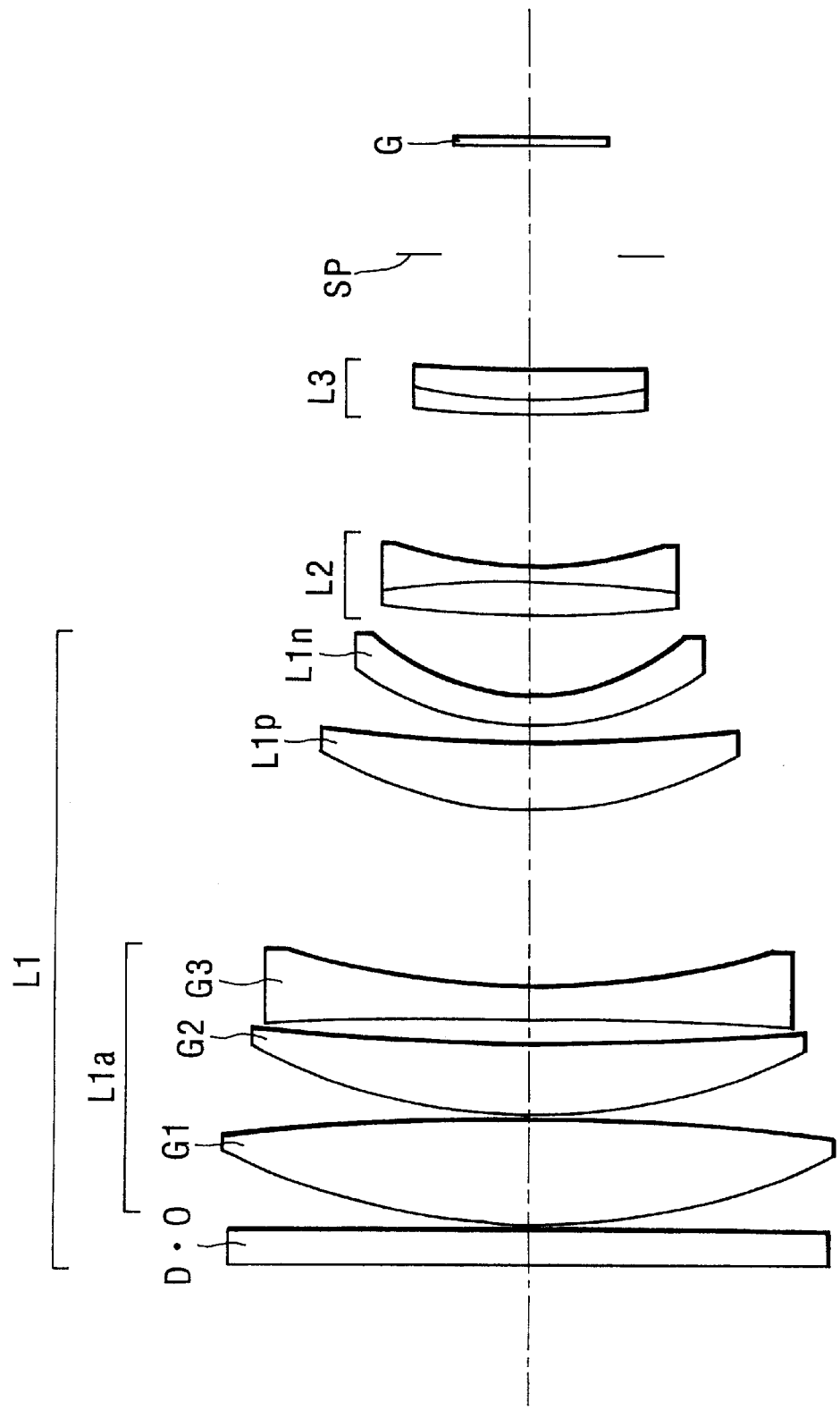
FIG. 3 is a longitudinal section view of a numerical example 1 of the optical system of the invention.
Figure 4:
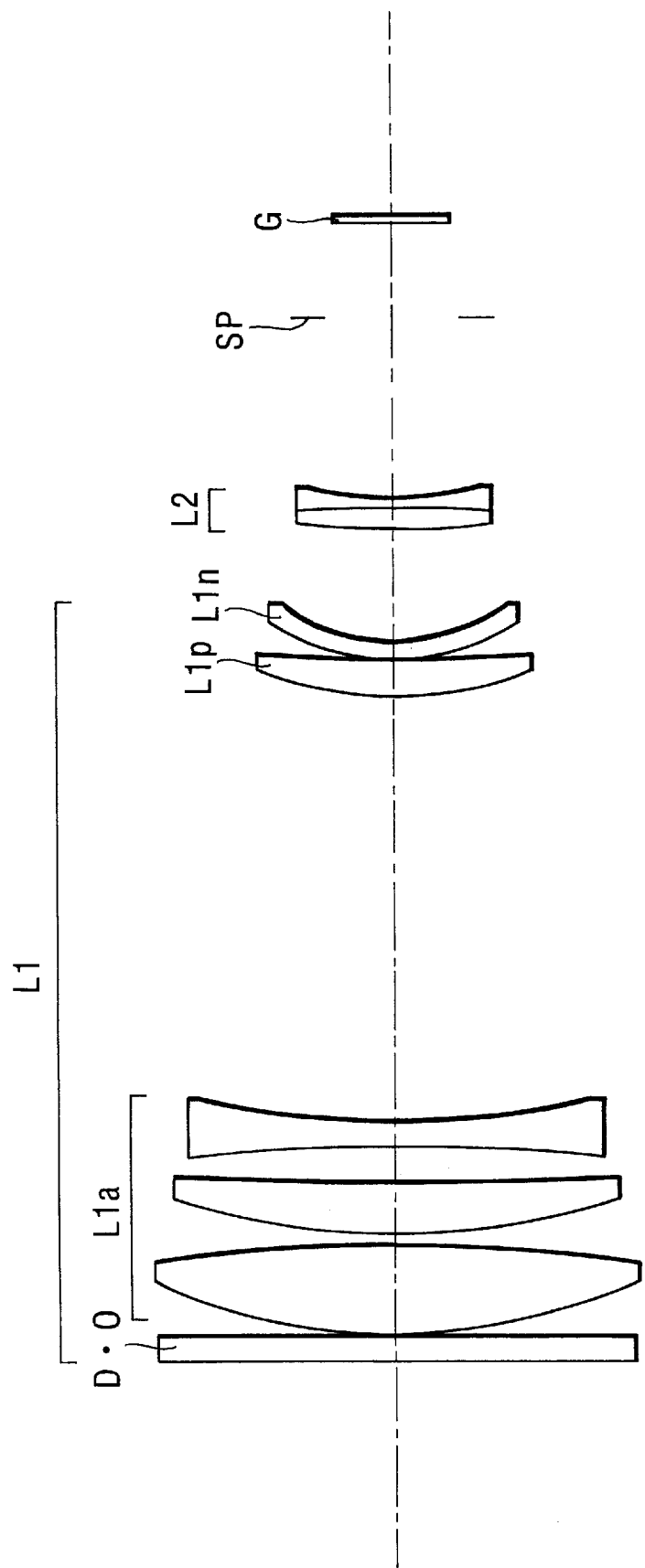
FIG. 4 is a longitudinal section view of a numerical example 2 of the optical system of the invention.

FIGS. 2A, 2B and 2C are graphs for explaining the correction of chromatic aberrations in the invention.

FIGS. 3 to 11 in block diagram show numerical examples 1 to 9 of the invention, respectively. FIGS. 12A1 to 12A4 and 12B1 to 12B4 through FIGS. 20A1 to 20A4 and 20B1 to 20B4 graphically show the aberrations of the numerical examples 1 to 9 of the invention, respectively. Of the aberration graphs, the ones whose figure numbers contain letter "A" are obtained during focusing on an infinitely distant object and the others whose figure numbers contain letter "B" are obtained during focusing on an object at a finite distance.

In FIGS. 3 to 11, D•O denotes a diffractive optical element having a positive refractive power composed of a diffraction grating of revolution symmetry with respect to an optical axis of the optical system. L1 denotes a first lens unit having a positive refractive power. L2 denotes a second lens unit having a negative refractive power, which is made to axially move toward the image side during focusing from an infinitely distant object to an object at the minimum distance. L3 denotes a third lens unit having a positive refractive power. SP stands for a stop, and G stands for a glass block, such as optical filter or face plate.

In the numerical examples 1, 2, 4, 5, 7 and 8 shown in FIGS. 3, 4, 6, 7, 9 and 10, respectively, the first lens unit L1 is composed of the diffractive optical element D•O, a first lens subunit L1a of positive refractive power, a positive lens L1p, and a negative lens L1n of meniscus form concave toward the image side.

Figure 5:
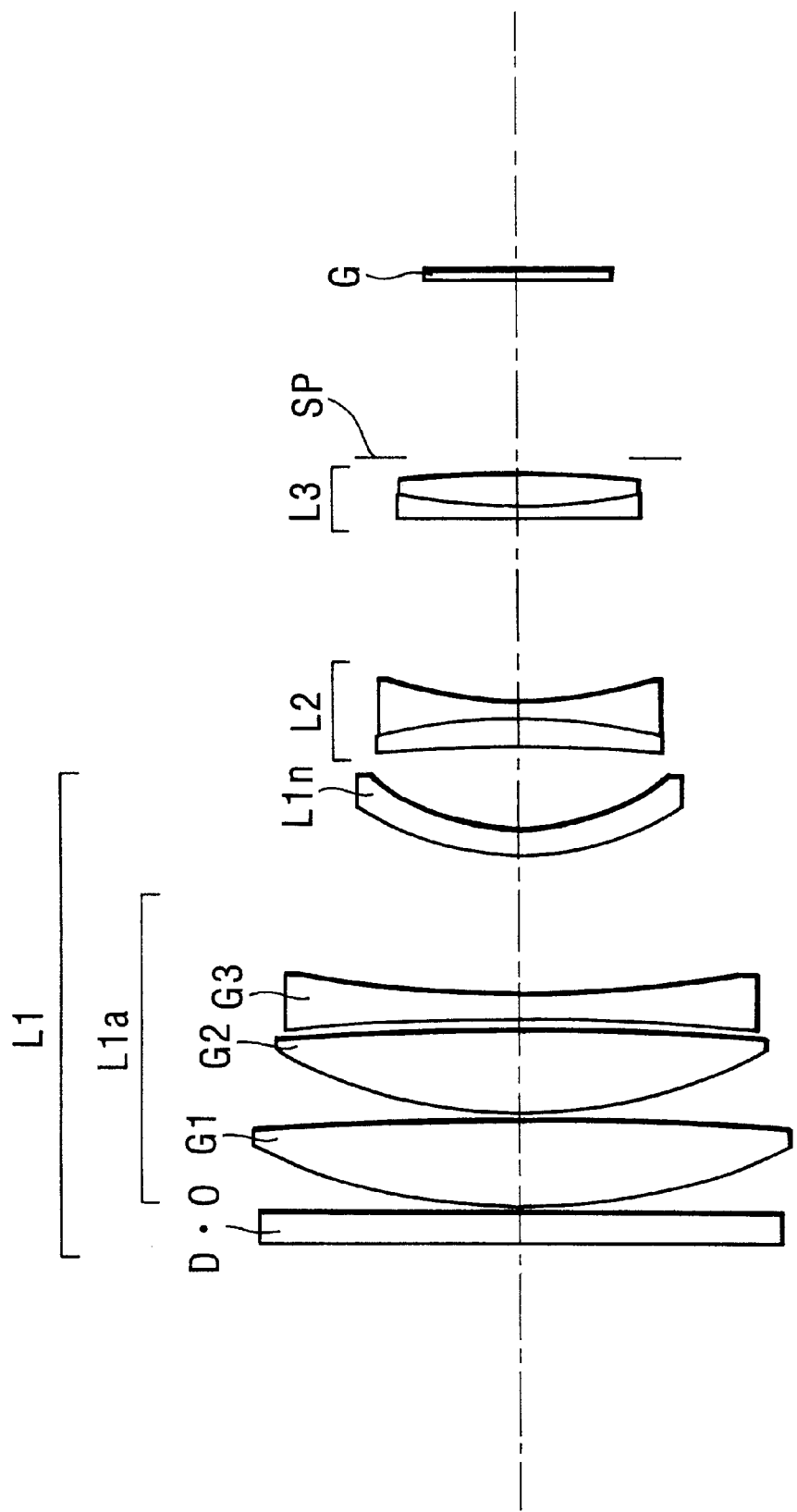
FIG. 5 is a longitudinal section view of a numerical example 3 of the optical system of the invention.
Figure 6:
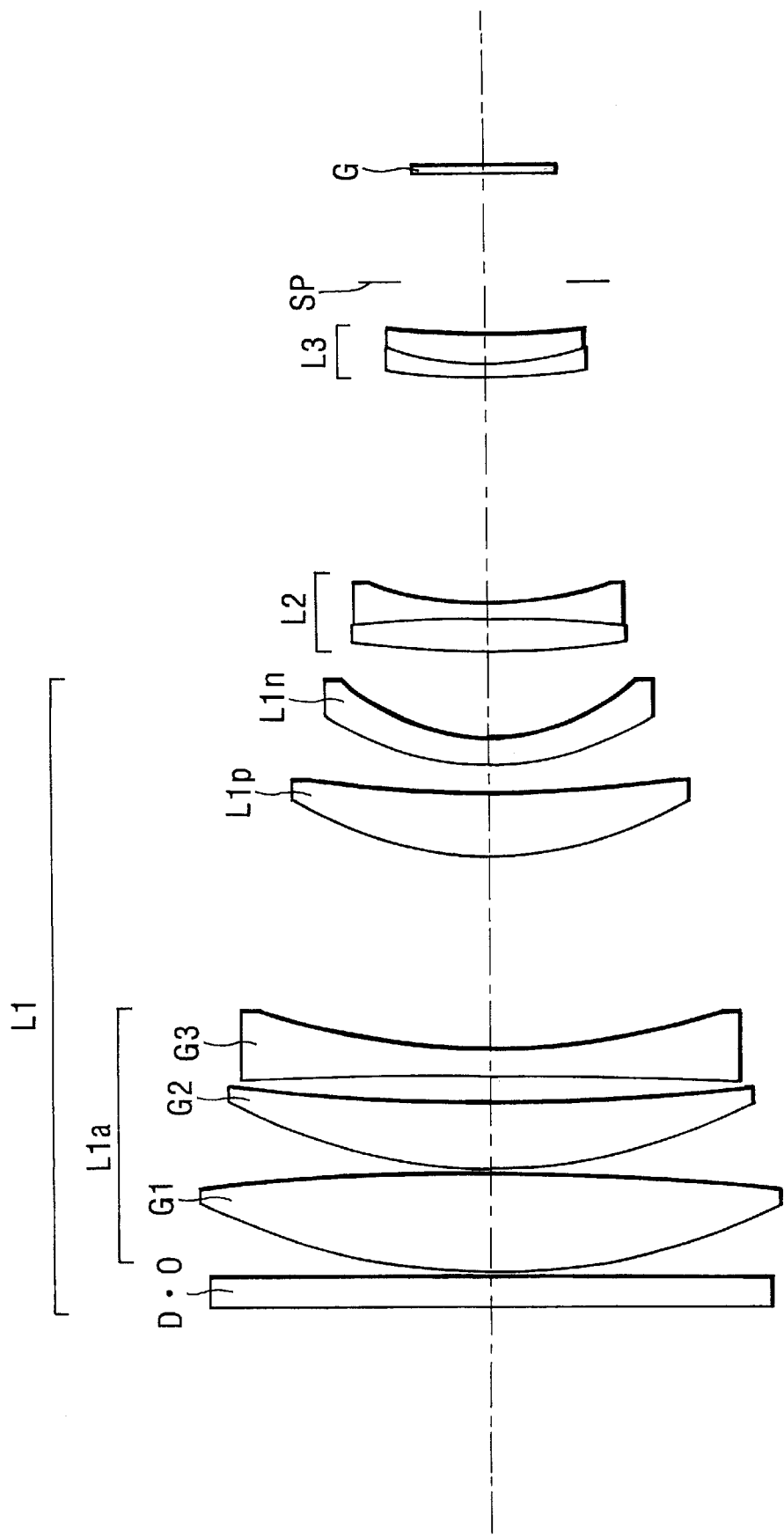
FIG. 6 is a longitudinal section view of a numerical example 4 of the optical system of the invention.
Figure 7:
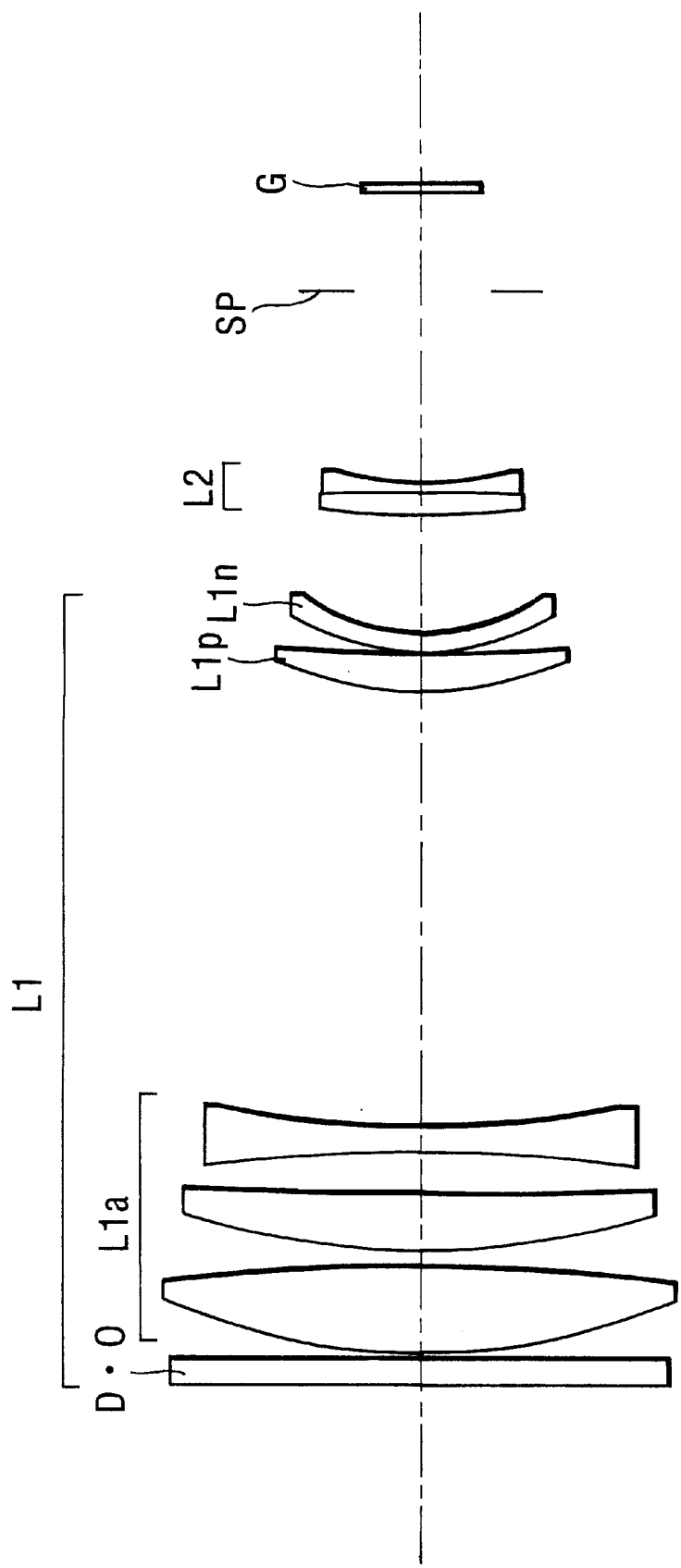
FIG. 7 is a longitudinal section view of a numerical example 5 of the optical system of the invention.
Figure 8:
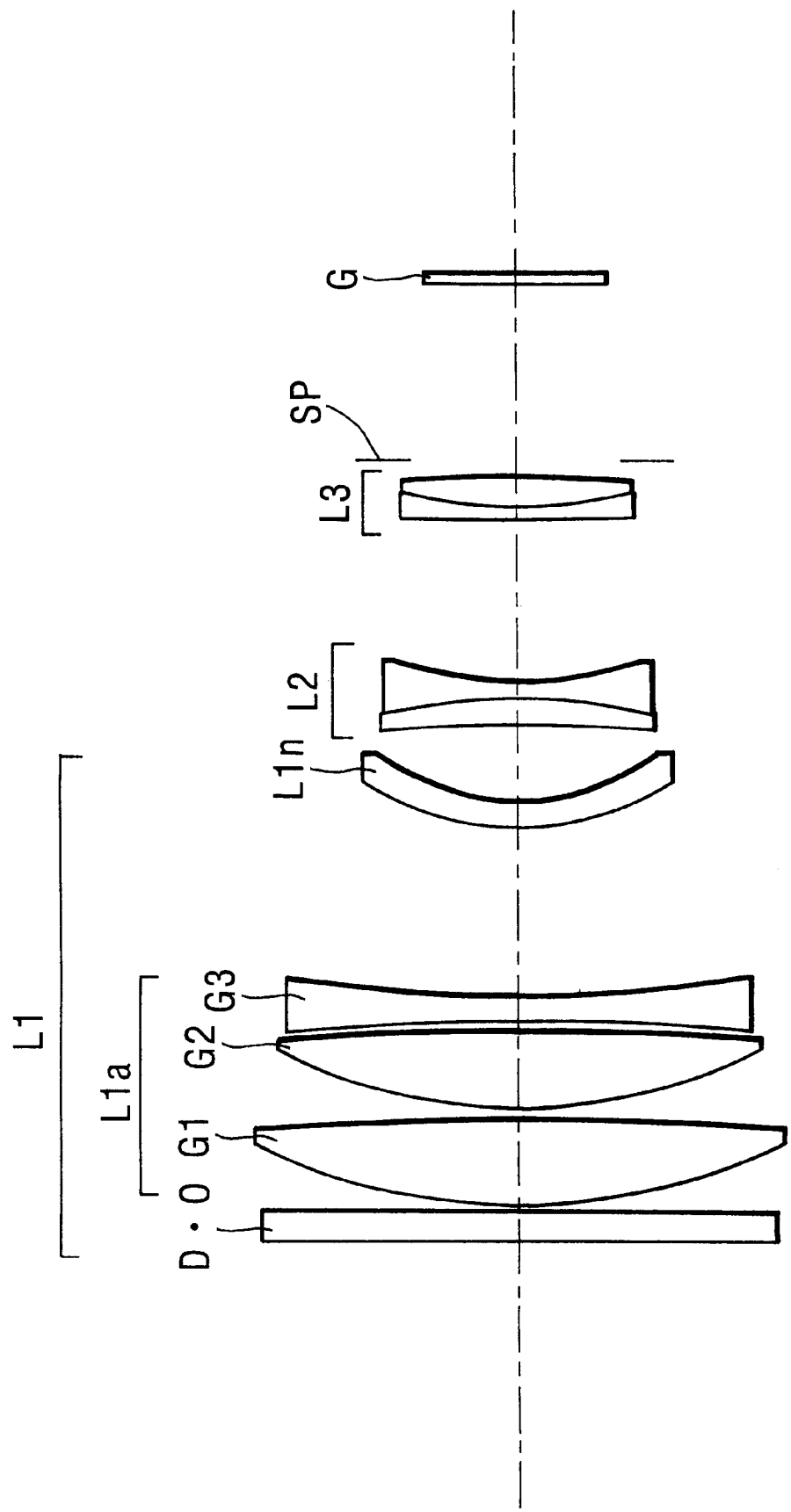
FIG. 8 is a longitudinal section view of a numerical example 6 of the optical system of the invention.
Figure 9:
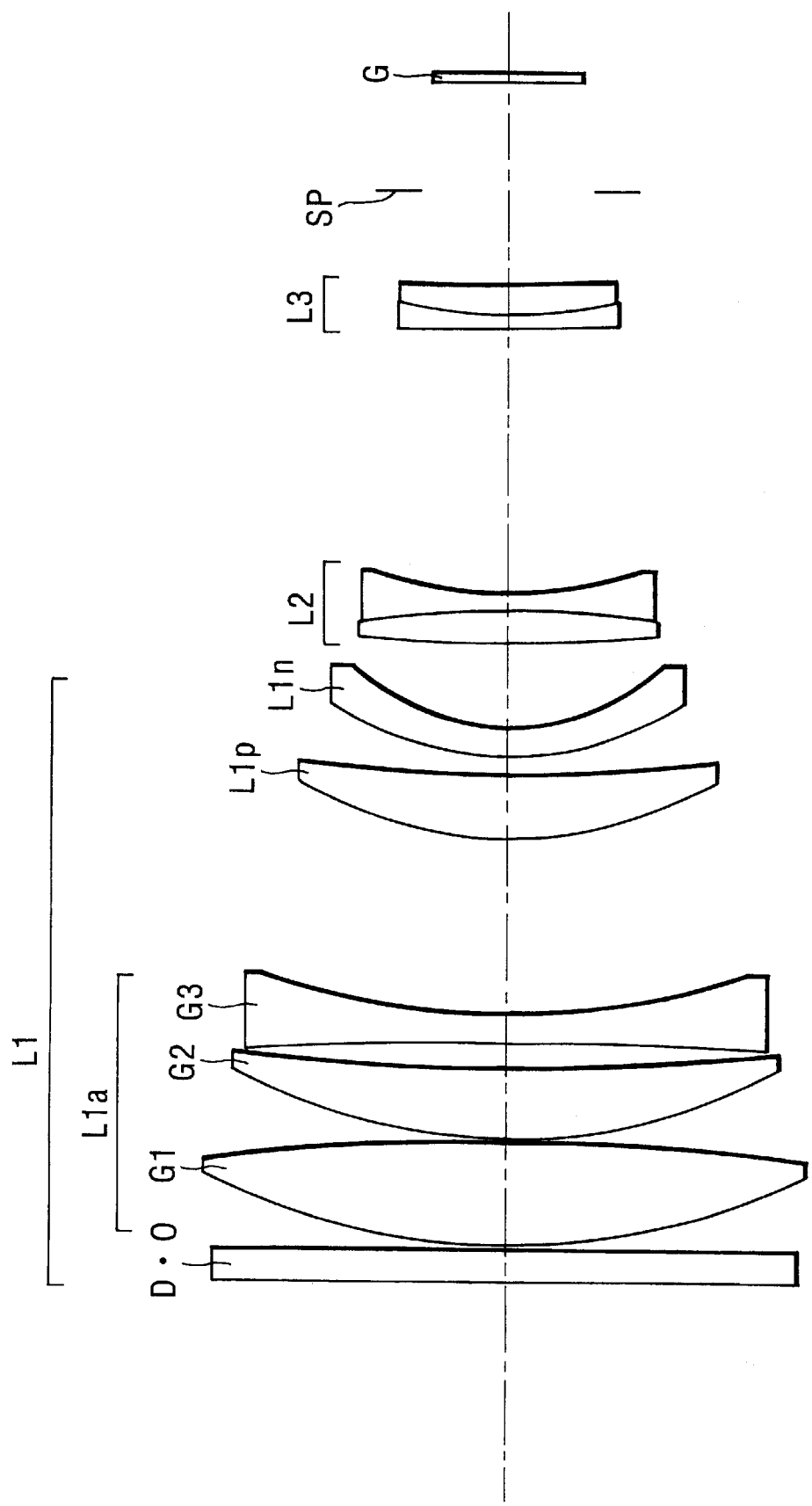
FIG. 9 is a longitudinal section view of a numerical example 7 of the optical system of the invention.
Figure 10:
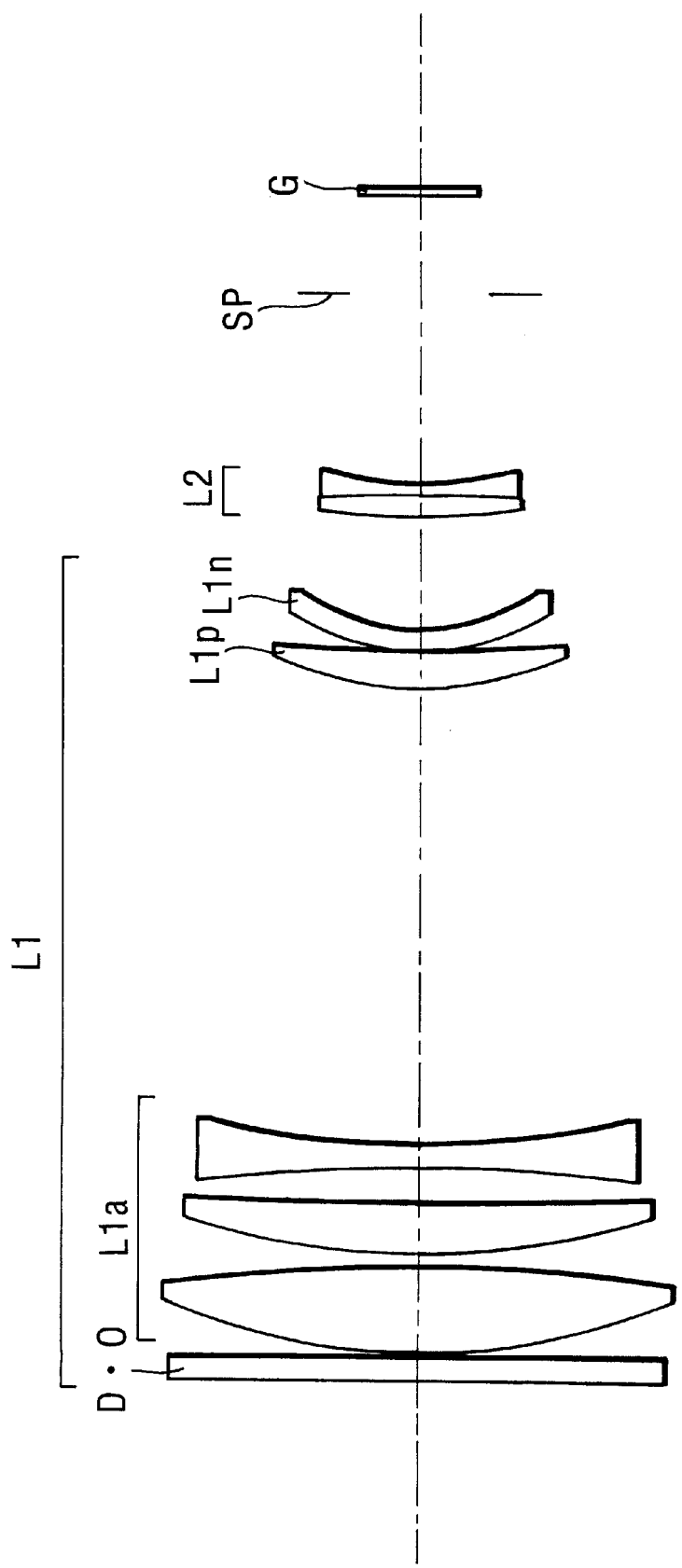
FIG. 10 is a longitudinal section view of a numerical example 8 of the optical system of the invention.
Figure 11:
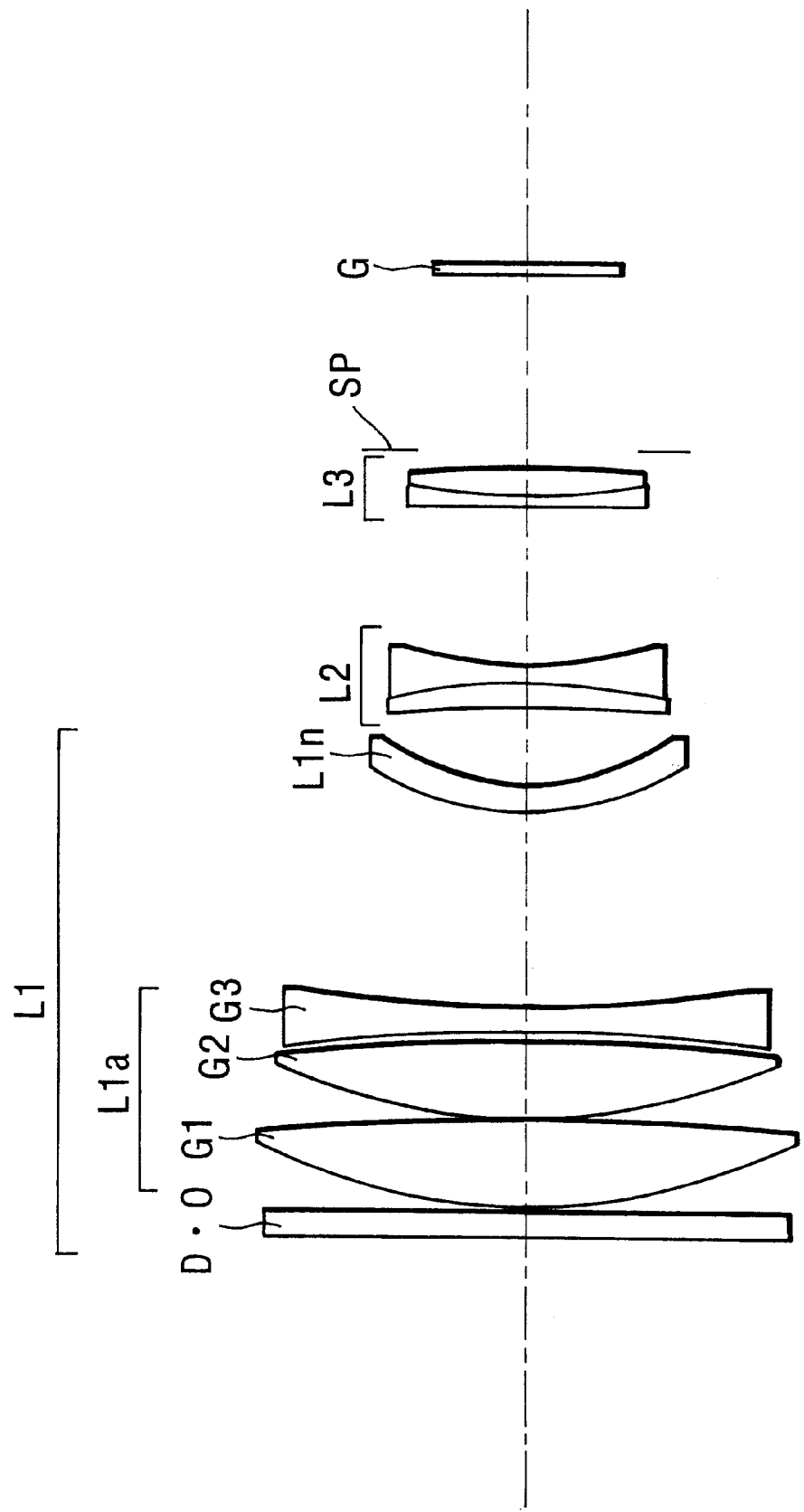
FIG. 11 is a longitudinal section view of a numerical example 9 of the optical system of the invention.

In the numerical examples 3, 6 and 9 shown in FIGS. 5, 8 and 11, respectively, the first lens unit L1 is composed of the diffractive optical element D•O, a first lens subunit L1a of positive refractive power, and a negative lens L1n of meniscus form concave toward the image side.

In the numerical examples 1 to 9, the first lens subunit L1a has a bi-convex positive lens G1, a positive lens G2, and a bi-concave negative lens G3.

The second lens unit L2 is constructed with a cemented lens composed of a positive lens and a negative lens.

In the numerical examples 1, 3, 4, 6, 7 and 9 shown in FIGS. 3, 5, 6, 8, 9 and 11, respectively, on the image side of the second lens unit L2 there is provided a third lens unit L3, which is constructed with a cemented lens composed of a positive lens and a negative lens.

Next, referring to FIG. 1, the features of the optical system of the invention are explained.

At first, on the diffraction surface D and the refractive optical system part M in combination, the formulae for the longitudinal chromatic aberration coefficient (L) and the lateral chromatic aberration coefficient (T) are obtained as follows:

$$L = h_D^2 \phi_D / \nu_D + h_M^2 \phi_M \nu_M \quad (4)$$

$$T = h_D \bar{h}_D \phi_D / \nu_D + h_M \bar{h}_M \phi_M / \nu_M \quad (5)$$

where $\phi_D$: the refractive power for the diffracted light in the design diffraction order of the diffraction surface D, $\phi_M$: the refractive power of the refractive optical system M, $\nu_D$: the reduced Abbe number (equivalent to −3.45) of the diffraction surface D, $\nu_M$: the Abbe number of the refractive optical system part M (the thin single lens), $h_D$: the height of incidence of the paraxial on-axial ray on the diffraction surface D, $h_M$: the height of incidence of the paraxial on-axial ray on the refractive optical system part M, $\bar{h}_D$: the height of incidence of the pupil paraxial ray on the diffraction surface D, and $\bar{h}_M$: the height of incidence of the pupil paraxial ray on the refractive optical system part M.

In actual practice, the refractive optical system part M is constructed with a plurality of lens surfaces i (where i=1, . . . and n). Therefore, the second terms of the equations (4) and (5) each should be expressed by the total sum of the aberration coefficients of all the surfaces, i.e., the first surface to the n-th surface, as follows:

$$L = h_D^2 \phi_D / \nu_D + \sum_{i=1}^{n} h_{Mi}^2 \phi_{Mi} / \nu_{Mi} \quad (6)$$

$$T = h_D \bar{h}_D \phi_D / \nu_D + \sum_{i=1}^{n} h_{Mi} \bar{h}_{Mi} \phi_{Mi} / \nu_{Mi} \quad (7)$$

Now, since the equations (6) and (7) have their second terms concerned with the refractive optical system part M, because its overall refractive power is substantially positive, the second terms of the equations (6) and (7) take, in most cases, values of the same sign as that of the single lens model. Therefore, a discussion may be provided of the equations (4) and (5) for the single lens model without causing any particular inconvenience. So, in the following, an explanation is provided by using the equations (4) and (5).

In the equation (4), the second term is for the longitudinal chromatic aberration coefficient of the refractive optical system part M.

Since $\phi_M > 0$ and $\nu_M > 0$, the following relation is obtained:

$h_M^2 \phi_M / \nu_M > 0$

In order to reduce the longitudinal chromatic aberration coefficient of the entire optical system, therefore, the first term for the longitudinal chromatic aberration coefficient of the diffraction surface D must take a negative value. That is, the following relation is obtained:

$h_D^2 \phi_D / \nu_D < 0$

Here, since $\nu_D < 0$, the refractive power of the diffraction surface D should be as follows:

$\phi_D > 0$

In this instance, in the equation (5), the first term for the lateral chromatic aberration coefficient of the diffraction surface D is found from $h_D > 0$, $\bar{h}_D > 0$ and $\nu_D < 0$, to be $h_D \bar{h}_D \phi_D / \nu_D < 0$.

Also, in the equation (5), the second term for the lateral chromatic aberration coefficient of the refractive optical system part M is found from $h_M > 0$, $\bar{h}_M > 0$, $\phi_M > 0$ and $\nu_M > 0$, to be $h_M \bar{h}_M \phi_M / \nu_M > 0$.

Accordingly, the lateral chromatic aberration coefficient of the refractive optical system part M is canceled by the lateral chromatic aberration coefficient of the diffraction surface D, thus making it possible to reduce the lateral chromatic aberration coefficient of the entire optical system to a minimum.

In conclusion, as the refractive power of the diffraction surface D is given a positive value, the refractive optical system part M has its longitudinal and lateral chromatic aberration coefficients canceled in each at once, so that it becomes possible to improve the achromatism of the entire optical system.

On this account, what is to be considered is that the heights of incidence of the paraxial on-axial ray and the pupil paraxial ray both have positive values, and the absolute values of them are large. In this sense, the first lens unit of positive refractive power makes a large contribution to chromatic aberration. Hence, it becomes a necessary condition to provide the first lens unit with at least one diffraction surface having a positive refractive power, so that chromatic aberration is corrected well in at least a reference setting.

The discussion of the above-described type of achromatism by the chromatic aberration coefficients is concerned with two wavelengths and is not always valid in the entire visible spectrum. Including the variation of chromatic aberrations with focusing, the chromatic correction has to further improve over the entire visible spectrum. For this purpose, certain rules of design are to set forth as described below.

First, a case where the refractive optical system part M is corrected for longitudinal chromatic aberration in itself without using the extraordinary partial dispersion glass is considered. In this case, the spectrum curve is usually of the shape shown in FIG. 2A, whose curvature is convex downward and which crosses the abscissa at a design wavelength and another one wavelength, or is achromatized in two colors. That is, it becomes the so-called "achromatic type" spectrum curve.

Next, a spectrum curve the diffraction surface D can give is considered.

The phase shape $\psi_D$ of the diffraction surface D can be given by the following polynomial expression:

$$\psi_D(h, m) = (2\pi / (m\lambda_0))(C_1 h^2 + C_2 h^4 + C_3 h^6 + \ldots) \quad (8)$$

where h: the height in a direction vertical to the optical axis, m: an order number of the diffracted ray, $\lambda_0$: the design wavelength, and $C_i$: phase coefficients (i=1, 2, 3, . . . ).

Such a shape gives the diffraction surface D a refractive power $\phi_D$ which can be defined for an arbitrary wavelength $\lambda$ and an arbitrary order number m by using the phase coefficient $C_1$ as follows:

$$\phi_D(\lambda, m) = -2C_1 m\lambda / \lambda_0 \quad (9)$$

If, in the equation (9), the diffraction order number m is taken at, for example, "1", and the phase coefficient is chosen to be a negative value, the refractive power of the diffraction surface D can be made positive. As is apparent from the equation (9), it is in a wavelength region of "$\lambda > \lambda_0$" that, as the wavelength increases, the positive refractive power of the diffraction surface D increases as a linear function of variation of the wavelength. Conversely, in the other wavelength region of "$\lambda < \lambda_0$", as the wavelength decreases, the positive refractive power of the diffraction surface D decreases as a linear function of variation of the wavelength.

In other words, on the assumption that the refractive optical system M is free from longitudinal chromatic aberration, then it results that, as the ray of the design wavelength $\lambda_0$ is focused at a position of the image plane of the entire optical system, the paraxial rays whose wavelengths are longer than the design wavelength $\lambda_0$ have their focuses falling ahead of the image plane, while the paraxial rays whose wavelengths are shorter than the design wavelength $\lambda_0$ have their focuses behind the image plane and, moreover, that the focus position shifts as a linear function of variation of the wavelength. (see FIG. 2B)

This leads to provide a possibility of canceling the residual chromatic aberration of the refractive optical system part M by the diffraction surface D to allow achromatization for the entire visible spectrum. For this purpose, because the diffraction surface D alone cannot give any solution for the spectrum of upward convex curvature, it has after all been found out that there is need to adjust the designing of the refractive optical system part M to the linear correction characteristic of the diffraction surface D so that longitudinal chromatic aberration, which shifts linearly in the slope reverse to the linear correction characteristic of the diffraction surface D, is beforehand produced in the visible spectrum by the refractive optical system part M.

In order to assure the above, it becomes necessary that the first lens unit L1 of the refractive optical system part M be provided with the first lens subunit L1a consisting of at least one positive lens and at least one negative lens and having a positive refractive power as a whole, and that the conditions (1), (2) and (3) described before be satisfied.

By setting forth such rules of design, the spectrum curve of the refractive optical system part M can be controlled with the design wavelength at the center so that the longer wavelength region than the design wavelength is made more under-corrected and the shorter wavelength region is made more over-corrected. With this control, the position of the minimum point of the spectrum curve can be made to shift to shorter wavelengths. As a result, the spectrum curve of the refractive optical system part M becomes almost linear in shape over the entire visible spectrum (see FIG. 2C). In addition, the condition (1) described before is taken into account in determining the refractive power of the diffraction surface D. Achromatization for the entire visible spectrum, including good stability of chromatic correction with focusing, can thus be achieved.

The conditions (1), (2) and (3) are explained below.

The inequalities of condition (1) are concerned with the ratio of the refractive powers of the diffraction surface D and the first lens subunit L1a. When the upper limit of the condition (1) is exceeded, as this means that the refractive power of the diffraction surface D is too strong, the longitudinal chromatic aberration spectrum line of the diffraction surface D becomes a large absolute value of the slope. In conformity with the large absolute value of the slope, the spectrum curve of the refractive optical system part M, too, has to decline largely, while keeping the linear shape. Spherical aberration, color spherical aberrations and other aberrations are caused to worsen, which the diffraction surface D cannot sufficiently correct by its aspherical effect (corresponding to the terms for the phases in higher degrees of the equation (8)). Also, as is understandable from the first terms of the equations (5) and (6), as the refractive power of the diffraction surface D increases, the absolute value of the chromatic aberration coefficient of the diffraction surface D, too, increases. As a result, for the object movement, too, the chromatic aberration coefficient of the diffraction surface D varies greatly. The rear stage of the diffraction surface D, i.e., the first and second lens units, cannot fully correct the variation of chromatic aberration. Further, the pitch of the diffraction grating becomes much too fine to manufacture economically. So, the violation is objectionable. Conversely, when the refractive power of the diffraction surface D is weaker than the lower limit of the condition (1), as this implies that the absolute value of the slope of the longitudinal spectrum line of the diffraction surface D is too small, the slope of the spectrum curve of the refractive optical system part M cannot be made small while keeping a linear shape. In the shorter wavelength region than the design wavelength, therefore, a tough curvature convex downward is produced, making it impossible for the diffraction surface D to cancel the longitudinal chromatic aberration. So, the violation is objectionable.

The inequalities of conditions (2) and (3) have such an aim that, while keeping the refractive optical system part M good in aberrations other than chromatic aberration, the spectrum curve, especially with respect to the longitudinal chromatic aberration, is given a proper slope and its curvature is made looser to sustain an almost linear shape. When the upper limit of the condition (2) or the lower limit of the condition (3) is exceeded, as this implies that the spectrum curve in the shorter wavelength region than the design wavelength is too much tough in curvature, it becomes difficult for the diffraction surface D to fully correct chromatic aberration. When the lower limit of the condition (2) or the upper limit of the condition (3) is exceeded, the spectrum curve is improved in linearity, but each of the constituent lenses of the refractive optical system part M suffers collapsing of the distribution of the refracting powers over its surfaces, making it impossible to correct aberrations other than chromatic aberration in good balance. So, the violation is objectionable. Along with this, it also becomes necessary to strengthen the refractive power of the diffraction surface D. Therefore, the chromatic aberration coefficient of the diffraction surface D, too, is caused to increase in absolute value. As a result, the chromatic aberration coefficient for the object movement of the diffraction surface D varies to a large extent. Such a variation of the chromatic aberration is hard to correct fully by the rear stage, i.e., the second lens unit.

For more desired results, it is preferred that the conditions (1), (2) and (3) have their numerical ranges for the values $\phi_D/\phi_{1a}$, $v_{1ap}$ and $v_{1an}$ respectively more restricted as follows:

$$0.009 < \phi_D/\phi_{1a} < 0.021 \tag{10}$$

$$56 < v_{1ap} < 71 \tag{11}$$

$$30 < v_{1an} < 50 \tag{12}$$

The satisfaction of the above conditions (10), (11) and (12) can further improve the correction of chromatic aberration and other aberrations and also their variations with focusing.

Further, in the present invention, in order to further reduce the range of variation of aberrations with focusing and to obtain a high image quality over the entire area of the image frame, it is preferred to satisfy at least one of the following conditions:

(i) The refractive power $\phi_{1a}$ of the first lens subunit L1a lies within the following range:

$$0.5 < \phi_{1a}/\phi < 5 \tag{13}$$

where $\phi$ is the refractive power of the entire optical system.

The inequalities of condition (13) are valid after the conditions (1), (2) and (3) are satisfied and have an aim to improve the chromatic aberration and the other various aberrations and their variations with focusing.

Either when the upper limit of the condition (13) is exceeded or when the lower limit thereof is exceeded, all of the chromatic aberration and the other various aberrations become difficult to further improve.

For more desired results, the numerical range of the condition (13) is preferably made to be altered as follows:

$$0.95 < \phi_{1a}/\phi < 1.9 \qquad (13)$$

(ii) The second lens unit L2 has one positive lens and one negative lens and satisfies the following conditions:

$$-5 < \phi_2/\phi < -1 \qquad (14)$$

$$20 < v_{2p} < 30 \qquad (15)$$

$$30 < v_{2n} < 50 \qquad (16)$$

where $\phi_2$: the refractive power of the second lens unit, $v_{2p}$: the Abbe number of a material of the positive lens included in the second lens unit, and $v_{2n}$: the Abbe number of a material of the negative lens included in the second lens unit.

The conditions (14), (15) and (16) are valid after the conditions (1), (2) and (3) or the condition (13) is satisfied and have an aim to further improve the chromatic aberration and the other various aberrations and their variations with focusing and have another aim to make the optical system adaptable to the camera having an auto-focus capability by reducing the weight and shortening the forward movement of the focusing lens unit.

The inequalities of condition (14) give a proper range for the ratio of the refractive powers of the second lens unit and the entire optical system. When the upper limit of the condition (14) is exceeded, as this means that the refractive power of the second lens unit is too strong, an increase of the refractive power of the first lens unit, too, results. Although the diameter and the focusing movement of the second lens unit decrease, the aberration in the reference setting and the variation of aberrations with focusing both are caused to worsen objectionably. Conversely, when the refractive power of the second lens unit weakens beyond the lower limit of the condition (14), an advantage is produced for correction of the aberrations, but the diameter and the focusing movement of the second lens unit increases objectionably.

The conditions (15) and (16) are set forth for the purpose of correcting the variation of chromatic aberration well. Either when the upper limit is exceeded or when the lower limit is exceeded, the range of variation of chromatic aberration increases greatly. So, these factors are better made to fall within the numerical ranges specified.

For more desired results, it is preferred that the conditions (14), (15) and (16) have their numerical ranges for the values $\phi_2/\phi$, $v_{2p}$ and $v_{2n}$ respectively more restricted as follows:

$$-2.8 < \phi_2/\phi < -1.7 \qquad (17)$$

$$22 < v_{2p} < 25 \qquad (18)$$

$$33 < v_{2n} < 47 \qquad (19)$$

Also, upon having satisfied the conditions (1), (2) and (3), especially the conditions (10), (11) and (12), or the condition (13), or the conditions (14), (15) and (16), especially the conditions (17), (18) and (19), it is preferred to construct the first lens subunit L1a with, in order from the object side to the image side, a positive lens, a positive lens and a negative lens, totaling three lenses, thereby producing an advantage of correcting well spherical aberration, coma, and astigmatism and their variations with focusing.

Further, a negative lens of meniscus form concave toward the image side may be added on the image side of the first lens subunit L1a, thereby improving the variation of mainly spherical aberration with focusing much more.

Next, nine numerical examples 1 to 9 of the invention are shown. In the numerical data for the examples 1 to 9, ri is the radius of curvature of the i-th lens surface, when counted from the object side, di is the axial distance between the i-th and (i+1)st surfaces in the reference setting, when counted from the object side, and ni and vi are respectively the refractive index and Abbe number for the spectral d-line of the i-th lens element, when counted from the object side. Incidentally, f stands for the focal length and Fno stands for F-number, and 2ω stands the field angle.

It is to be noted in each numerical example that the phase shape ψ of the diffraction surface is expressed by the following equation:

$$\psi(h, m) = (2\pi/m\lambda_0)(C_1 h^2 + C_2 h^4 + C_3 h^6 + \ldots)$$

where h: the height in a direction vertical to the optical axis, m: the order number of the diffracted rays, $\lambda_0$: the design wavelength, and $C_i$: the phase coefficients (i=1, 2, 3, . . . ).

In each numerical example, the order number "m" of the diffracted rays is taken at "1", and the design wavelength $\lambda_0$ is taken at the spectral d-line (587.56 nm).

Numerical Example 1:

| f = 390.000 Fno = 1:2.91 2ω = 6.35° | | | |
|---|---|---|---|
| r1 = ∞ | d1 = 7.70 | n1 = 1.45867 | v1 = 67.9 |
| *r2 = ∞ | d2 = 1.00 | | |
| r3 = 160.719 | d3 = 23.00 | n2 = 1.51633 | v2 = 64.2 |
| r4 = −669.066 | d4 = 1.09 | | |
| r5 = 131.417 | d5 = 16.00 | n3 = 1.51633 | v3 = 64.2 |
| r6 = 541.953 | d6 = 5.89 | | |
| r7 = −1579.038 | d7 = 7.00 | n4 = 1.83170 | v4 = 37.0 |
| r8 = 184.386 | d8 = 40.19 | | |
| r9 = 92.935 | d9 = 14.50 | n5 = 1.51633 | v5 = 64.2 |
| r10 = 326.653 | d10 = 3.97 | | |
| r11 = 69.383 | d11 = 6.50 | n6 = 1.77154 | v6 = 32.1 |
| r12 = 52.352 | d12 = 18.12 | | |
| r13 = 286.035 | d13 = 7.50 | n7 = 1.85000 | v7 = 23.0 |
| r14 = −252.113 | d14 = 3.50 | n8 = 1.79541 | v8 = 34.4 |
| r15 = 94.805 | d15 = 34.02 | | |
| r16 = 370.404 | d16 = 3.00 | n9 = 1.71909 | v9 = 28.3 |
| r17 = 137.065 | d17 = 6.50 | n10 = 1.86089 | v10 = 26.8 |
| r18 = 600.357 | d18 = 26.36 | | |
| r19 = Stop | d19 = 25.00 | | |
| r20 = ∞ | d20 = 2.00 | n11 = 1.51633 | v11 = 64.2 |
| r21 = ∞ | | | |

Aspheric Phase Coefficients:

$C_1 = -2.4877 \times 10^{-5}$   $C_2 = 2.6305 \times 10^{-10}$   $C_3 = -5.5461 \times 10^{-14}$

*: Diffraction Surface

Numerical Example 2:

| f = 585.000 Fno = 1:4.12 2ω = 4.24° | | | |
|---|---|---|---|
| r1 = ∞ | d1 = 7.50 | n1 = 1.45867 | v1 = 67.9 |
| *r2 = ∞ | d2 = 1.00 | | |
| r3 = 184.160 | d3 = 25.00 | n2 = 1.51633 | v2 = 64.2 |

-continued

| f = 585.000 Fno = 1:4.12 2ω = 4.24° | | | |
|---|---|---|---|
| r4 = −584.658 | d4 = 3.94 | | |
| r5 = 225.610 | d5 = 14.61 | n3 = 1.51633 | ν3 = 64.2 |
| r6 = 1433.116 | d6 = 10.92 | | |
| r7 = −567.224 | d7 = 7.00 | n4 = 1.80656 | ν4 = 37.7 |
| r8 = 268.227 | d8 = 124.53 | | |
| r9 = 108.895 | d9 = 10.80 | n5 = 1.51633 | ν5 = 64.2 |
| r10 = 499.231 | d10 = 0.15 | | |
| r11 = 69.080 | d11 = 5.00 | n6 = 1.63138 | ν6 = 33.5 |
| r12 = 57.497 | d12 = 33.43 | | |
| r13 = 257.060 | d13 = 6.00 | n7 = 1.85000 | ν7 = 23.0 |
| r14 = −645.982 | d14 = 2.80 | n8 = 1.85339 | ν8 = 43.1 |
| r15 = 106.748 | d15 = 53.07 | | |
| r16 = Stop | d16 = 27.76 | | |
| r17 = ∞ | d17 = 2.00 | n9 = 1.51633 | ν9 = 64.2 |
| r18 = ∞ | | | |

Aspheric Phase Coefficients:

$C_1 = -1.8736 \times 10^{-5}$  $C_2 = 9.8274 \times 10^{-11}$  $C_3 = -1.8124 \times 10^{-14}$

*: Diffraction Surface

Numerical Example 3:

| f = 389.988 Fno = 1:2.91 2ω = 8.46° | | | |
|---|---|---|---|
| r1 = ∞ | d1 = 7.30 | n1 = 1.51633 | ν1 = 64.1 |
| *r2 = ∞ | d2 = 1.00 | | |
| r3 = 159.485 | d3 = 22.50 | n2 = 1.51015 | ν2 = 68.0 |
| r4 = −690.349 | d4 = 1.39 | | |
| r5 = 131.363 | d5 = 15.70 | n3 = 1.48700 | ν3 = 70.4 |
| r6 = 540.029 | d6 = 6.05 | | |
| r7 = −1588.857 | d7 = 6.60 | n4 = 1.83889 | ν4 = 42.9 |
| r8 = 184.941 | d8 = 44.75 | | |
| r9 = 91.738 | d9 = 14.30 | n5 = 1.50435 | ν5 = 68.6 |
| r10 = 323.430 | d10 = 6.57 | | |
| r11 = 72.191 | d11 = 6.50 | n6 = 1.75649 | ν6 = 33.3 |
| r12 = 53.128 | d12 = 20.01 | | |
| r13 = 242.801 | d13 = 7.50 | n7 = 1.85000 | ν7 = 23.0 |
| r14 = −379.075 | d14 = 3.50 | n8 = 1.78390 | ν8 = 34.4 |
| r15 = 93.301 | d15 = 52.87 | | |
| r16 = 183.128 | d16 = 3.00 | n9 = 1.64392 | ν9 = 32.4 |
| r17 = 78.710 | d17 = 6.50 | n10 = 1.87376 | ν10 = 32.9 |
| r18 = 196.287 | d18 = 12.56 | | |
| r19 = Stop | d19 = 25.00 | | |
| r20 = ∞ | d20 = 2.00 | n11 = 1.51633 | ν11 = 64.2 |
| r21 = ∞ | | | |

Aspheric Phase Coefficients:

$C_1 = -3.7600 \times 10^{-5}$  $C_2 = 2.0170 \times 10^{-9}$
$C_3 = -3.0380 \times 10^{-13}$  $C_4 = 8.1254 \times 10^{-19}$

*: Diffraction Surface

Numerical Example 4:

| f = 292.506 Fno = 1:2.91 2ω = 6.35° | | | |
|---|---|---|---|
| r1 = ∞ | d1 = 6.00 | n1 = 1.45867 | ν1 = 67.9 |
| *r2 = ∞ | d2 = 1.00 | | |
| r3 = 120.922 | d3 = 16.50 | n2 = 1.51633 | ν2 = 64.2 |
| r4 = −712.166 | d4 = 1.36 | | |
| r5 = 102.601 | d5 = 15.16 | n3 = 1.51633 | ν3 = 64.2 |
| r6 = −721.270 | d6 = 1.86 | | |
| r7 = −492.775 | d7 = 4.50 | n4 = 1.82739 | ν4 = 30.7 |
| r8 = 259.377 | d8 = 26.36 | | |
| r9 = 57.444 | d9 = 5.00 | n5 = 1.63981 | ν5 = 40.7 |
| r10 = 46.599 | d10 = 15.47 | | |
| r11 = −321.564 | d11 = 5.30 | n6 = 1.85000 | ν6 = 23.0 |
| r12 = −103.619 | d12 = 3.20 | n7 = 1.61666 | ν7 = 42.6 |
| r13 = 83.998 | d13 = 33.99 | | |
| r14 = 1109.063 | d14 = 2.50 | n8 = 1.52539 | ν8 = 53.0 |
| r15 = 127.516 | d15 = 5.70 | n9 = 1.63751 | ν9 = 58.7 |
| r16 = −209.995 | d16 = 3.00 | | |
| r17 = Stop | d17 = 33.50 | | |
| r18 = ∞ | d18 = 2.00 | n10 = 1.51633 | ν10 = 64.2 |
| r19 = ∞ | | | |

Aspheric Phase Coefficients:

$C_1 = -2.3125 \times 10^{-5}$  $C_2 = 2.1079 \times 10^{-10}$
$C_3 = -4.8078 \times 10^{-14}$  $C_4 = 2.9442 \times 10^{-18}$

*: Diffraction Surface

Numerical Example 5:

| f = 585.002 Fno = 1:4.12 2ω = 4.24° | | | |
|---|---|---|---|
| r1 = ∞ | d1 = 7.50 | n1 = 1.51633 | ν1 = 64.1 |
| *r2 = ∞ | d2 = 1.00 | | |
| r3 = 185.594 | d3 = 25.00 | n2 = 1.50451 | ν2 = 68.5 |
| r4 = −574.943 | d4 = 4.41 | | |
| r5 = 227.587 | d5 = 15.90 | n3 = 1.48700 | ν3 = 70.4 |
| r6 = 1634.485 | d6 = 11.16 | | |
| r7 = −539.171 | d7 = 7.00 | n4 = 1.78460 | ν4 = 39.8 |
| r8 = 285.254 | d8 = 121.49 | | |
| r9 = 104.508 | d9 = 10.80 | n5 = 1.48739 | ν5 = 70.4 |
| r10 = 459.797 | d10 = 0.62 | | |
| r11 = 70.658 | d11 = 5.00 | n6 = 1.60934 | ν6 = 42.0 |
| r12 = 57.996 | d12 = 33.98 | | |
| r13 = 249.265 | d13 = 6.00 | n7 = 1.82293 | ν7 = 23.7 |
| r14 = −1054.298 | d14 = 2.80 | n8 = 1.81745 | ν8 = 46.1 |
| r15 = 104.889 | d15 = 53.09 | | |
| r16 = Stop | d16 = 27.76 | | |
| r17 = ∞ | d17 = 2.00 | n9 = 1.51633 | ν9 = 64.2 |
| r18 = ∞ | | | |

Aspheric Phase Coefficients:

$C_1 = 1.8170 \times 10^{-5}$  $C_2 = 1.0117 \times 10^{-10}$
$C_3 = -1.6581 \times 10^{-14}$  $C_4 = 5.2668 \times 10^{-19}$

*: Diffraction Surface

Numerical Example 6:

| f = 292.500 Fno = 1:2.91 2ω = 8.46° | | | |
|---|---|---|---|
| r1 = ∞ | d1 = 6.00 | n1 = 1.51633 | ν1 = 64.1 |
| *r2 = ∞ | d2 = 1.00 | | |
| r3 = 119.545 | d3 = 16.50 | n2 = 1.51148 | ν2 = 67.9 |
| r4 = −737.740 | d4 = 1.96 | | |
| r5 = 104.417 | d5 = 14.75 | n3 = 1.48700 | ν3 = 70.4 |
| r6 = −717.698 | d6 = 1.89 | | |
| r7 = −498.380 | d7 = 4.50 | n4 = 1.84276 | ν4 = 33.1 |
| r8 = 272.750 | d8 = 32.11 | | |
| r9 = 57.112 | d9 = 5.00 | n5 = 1.61594 | ν5 = 52.3 |
| r10 = 46.182 | d10 = 14.81 | | |
| r11 = −368.144 | d11 = 5.30 | n6 = 1.85283 | ν6 = 23.9 |
| r12 = −112.781 | d12 = 3.20 | n7 = 1.59518 | ν7 = 45.1 |
| r13 = 82.135 | d13 = 31.19 | | |
| r14 = 555.034 | d14 = 2.50 | n8 = 1.54830 | ν8 = 46.2 |
| r15 = 92.937 | d15 = 5.70 | n9 = 1.66817 | ν9 = 56.2 |
| r16 = −305.554 | d16 = 3.00 | | |
| r17 = Stop | d17 = 33.50 | | |
| r18 = ∞ | d18 = 2.00 | n10 = 1.51633 | ν10 = 64.2 |
| r19 = ∞ | | | |

Aspheric Phase Coefficients:

$C_1 = -3.6388 \times 10^{-5}$  $C_2 = 2.0260 \times 10^{-9}$
$C_3 = -2.7330 \times 10^{-13}$  $C_4 = 3.8783 \times 10^{-18}$

*: Diffraction Surface

Numerical Example 7:

| f = 389.998 Fno = 1:2.91 2ω = 6.35° | | | |
|---|---|---|---|
| r1 = ∞ | d1 = 7.30 | n1 = 1.51633 | ν1 = 64.1 |
| *r2 = ∞ | d2 = 1.00 | | |
| r3 = 162.526 | d3 = 22.50 | n2 = 1.51823 | ν2 = 59.0 |
| r4 = −637.861 | d4 = 0.90 | | |
| r5 = 132.222 | d5 = 15.70 | n3 = 1.50137 | ν3 = 56.4 |
| r6 = 561.248 | d6 = 5.48 | | |
| r7 = −1421.030 | d7 = 6.60 | n4 = 1.81274 | ν4 = 36.3 |
| r8 = 183.908 | d8 = 39.41 | | |
| r9 = 92.593 | d9 = 14.30 | n5 = 1.48700 | ν5 = 70.4 |
| r10 = 355.839 | d10 = 4.40 | | |
| r11 = 74.407 | d11 = 6.50 | n6 = 1.67681 | ν6 = 29.9 |
| r12 = 54.010 | d12 = 18.75 | | |
| r13 = 365.814 | d13 = 7.50 | n7 = 1.85000 | ν7 = 23.0 |
| r14 = −222.882 | d14 = 3.50 | n8 = 1.79168 | ν8 = 34.1 |
| r15 = 101.096 | d15 = 60.40 | | |
| r16 = 923.368 | d16 = 3.00 | n9 = 1.54224 | ν9 = 47.2 |
| r17 = 112.581 | d17 = 6.50 | n10 = 1.88500 | ν10 = 41.0 |
| r18 = 753.908 | d18 = 20.78 | | |
| r19 = Stop | d19 = 25.00 | | |
| r20 = ∞ | d20 = 2.00 | n11 = 1.51633 | ν11 = 64.2 |
| r21 = ∞ | | | |

Aspheric Phase Coefficients:

$C_1 = -2.1950 \times 10^{-5}$   $C_2 = 2.2712 \times 10^{-10}$
$C_3 = -4.4010 \times 10^{-14}$   $C_4 = 2.8811 \times 10^{-18}$

*: Diffraction Surface

Numerical Example 8:

| f = 585.000 Fno = 1:4.12 2ω = 4.24° | | | |
|---|---|---|---|
| r1 = ∞ | d1 = 7.00 | n1 = 1.51633 | ν1 = 64.1 |
| *r2 = ∞ | d2 = 1.00 | | |
| r3 = 188.883 | d3 = 24.50 | n2 = 1.51823 | ν2 = 59.0 |
| r4 = −541.325 | d4 = 3.70 | | |
| r5 = 228.625 | d5 = 14.00 | n3 = 1.51112 | ν3 = 60.5 |
| r6 = 1667.988 | d6 = 10.12 | | |
| r7 = −541.274 | d7 = 6.50 | n4 = 1.78813 | ν4 = 34.9 |
| r8 = 270.504 | d8 = 128.24 | | |
| r9 = 100.617 | d9 = 10.80 | n5 = 1.48700 | ν5 = 70.4 |
| r10 = 478.068 | d10 = 0.15 | | |
| r11 = 70.049 | d11 = 5.50 | n6 = 1.58574 | ν6 = 38.8 |
| r12 = 56.777 | d12 = 32.50 | | |
| r13 = 242.722 | d13 = 5.50 | n7 = 1.85000 | ν7 = 23.0 |
| r14 = −743.445 | d14 = 2.80 | n8 = 1.84379 | ν8 = 43.9 |
| r15 = 101.782 | d15 = 53.44 | | |
| r16 = Stop | d16 = 27.90 | | |
| r17 = ∞ | d17 = 2.00 | n9 = 1.51633 | ν9 = 64.2 |
| r18 = ∞ | | | |

Aspheric Phase Coefficients:

$C_1 = 1.7925 \times 10^{-5}$   $C_2 = 1.3699 \times 10^{-10}$
$C_3 = -1.7985 \times 10^{-14}$   $C_4 = 4.8512 \times 10^{-19}$

*: Diffraction Surface

Numerical Example 9:

| f = 292.585 Fno = 1:2.91 2ω = 8.46° | | | |
|---|---|---|---|
| r1 = ∞ | d1 = 5.00 | n1 = 1.51633 | ν1 = 64.1 |
| *r2 = ∞ | d2 = 1.00 | | |
| r3 = 118.867 | d3 = 16.20 | n2 = 1.51633 | ν2 = 64.1 |
| r4 = −658.466 | d4 = 0.15 | | |
| r5 = 117.413 | d5 = 14.50 | n3 = 1.51823 | ν3 = 59.0 |
| r6 = −501.987 | d6 = 1.57 | | |
| r7 = −401.282 | d7 = 4.50 | n4 = 1.87130 | ν4 = 31.6 |
| r8 = 270.797 | d8 = 37.59 | | |
| r9 = 58.230 | d9 = 5.00 | n5 = 1.53513 | ν5 = 49.1 |
| r10 = 47.229 | d10 = 14.66 | | |
| r11 = −337.610 | d11 = 4.50 | n6 = 1.85000 | ν6 = 23.0 |
| r12 = −119.558 | d12 = 3.20 | n7 = 1.55484 | ν7 = 44.8 |
| r13 = 83.468 | d13 = 29.68 | | |
| r14 = 1305.135 | d14 = 2.50 | n8 = 1.57147 | ν8 = 41.1 |
| r15 = 121.977 | d15 = 5.30 | n9 = 1.73544 | ν9 = 52.1 |
| r16 = −304.382 | d16 = 3.00 | | |
| r17 = Stop | d17 = 33.50 | | |
| r18 = ∞ | d18 = 2.00 | n10 = 1.51633 | ν10 = 64.2 |
| r19 = ∞ | | | |

Aspheric Phase Coefficients:

$C_1 = -3.7400 \times 10^{-5}$   $C_2 = 2.3674 \times 10^{-9}$
$C_3 = -2.5645 \times 10^{-13}$   $C_4 = 3.0641 \times 10^{-18}$

*: Diffraction Surface

| Condition | Numerical Example | | |
|---|---|---|---|
| Factor | 1 | 2 | 3 |
| $\phi_D$ | 4.9754E-05 | 3.7472E-05 | 7.5200E-05 |
| $\phi_{1a}$ | 2.7930E-03 | 1.8793E-03 | 6.3617E-03 |
| $\phi$ | 2.5641E-03 | 1.7094E-03 | 3.4187E-03 |
| $\phi_2$ | −5.0512E-03 | −4.5674E-03 | −7.7767E-03 |
| $\phi_D/\phi_{1a}$ | 0.0178 | 0.0199 | 0.0118 |
| $\nu_{1ap}$ | 64.20 | 64.20 | 64.20 |
| $\nu_{1an}$ | 37.00 | 37.70 | 30.70 |
| $\phi_{1a}/\phi$ | 1.0893 | 1.0994 | 1.8608 |
| $\phi_2/\phi$ | −1.9700 | −2.6719 | −2.2747 |
| $\nu_{2p}$ | 23.00 | 23.00 | 23.00 |
| $\nu_{2n}$ | 34.40 | 43.10 | 42.60 |

| Condition | Numerical Example | | |
|---|---|---|---|
| Factor | 4 | 5 | 6 |
| $\phi_D$ | 4.6250E-05 | 3.6340E-05 | 7.2776E-05 |
| $\phi_{1a}$ | 2.5346E-03 | 1.8977E-03 | 6.0034E-03 |
| $\phi$ | 2.5642E-03 | 1.7094E-03 | 3.4188E-03 |
| $\phi_2$ | −4.5493E-03 | −4.3626E-03 | −7.3117E-03 |
| $\phi_D/\phi_{1a}$ | 0.0182 | 0.0191 | 0.0121 |
| $\nu_{1ap}$ | 69.20 | 69.45 | 69.15 |
| $\nu_{1an}$ | 42.90 | 39.80 | 33.10 |
| $\phi_{1a}/\phi$ | 0.9885 | 1.1102 | 1.7560 |
| $\phi_2/\phi$ | −1.7742 | −2.5521 | −2.1387 |
| $\nu_{2p}$ | 23.00 | 23.70 | 23.90 |
| $\nu_{2n}$ | 34.40 | 46.10 | 45.10 |

| Condition | Numerical Example | | |
|---|---|---|---|
| Factor | 7 | 8 | 9 |
| $\phi_D$ | 4.3900E-05 | 3.5850E-05 | 7.4800E-05 |
| $\phi_{1a}$ | 2.7288E-03 | 1.8972E-03 | 5.6838E-03 |
| $\phi$ | 2.5641E-03 | 1.7094E-03 | 3.4178E-03 |
| $\phi_2$ | −5.1350E-03 | −4.6495E-03 | −6.7224E-03 |
| $\phi_D/\phi_{1a}$ | 0.0161 | 0.0189 | 0.0132 |
| $\nu_{1ap}$ | 57.70 | 59.75 | 61.55 |
| $\nu_{1an}$ | 36.30 | 34.90 | 31.60 |
| $\phi_{1a}/\phi$ | 1.0642 | 1.1099 | 1.6630 |
| $\phi_2/\phi$ | −2.0026 | −2.7200 | −1.9669 |
| $\nu_{2p}$ | 23.00 | 23.00 | 23.00 |
| $\nu_{2n}$ | 34.10 | 43.90 | 44.80 |

It should be noted in connection with the embodiment of the invention that the diffraction surface of positive refractive power is the first one, but an additional diffraction surface may be used to thereby obtain a better optical performance. The diffraction surface to add may be either positive or negative in refractive power. Particularly, in the case of adding a diffraction surface of negative refractive power, it is better placed near to the image plane of the optical system at a position where the pupil paraxial ray is incident relatively high, and the paraxial on-axial ray is incident relatively low. By this arrangement, lateral chromatic aberration is even better corrected. It should be also noted that every diffraction surface is applied to a parallel flat plate of glass (except to the filter which, although being a parallel flat glass plate, has no diffraction surface applied), as a base on one side thereof. However, the spherical lens or the aspherical lens may be used as the base for the diffraction surface, and both surfaces of the base may be formed as diffraction surfaces. Further, the diffraction surface may be applied to a cementing surface of a cemented lens. The material of the base may be anything but glass in particular, provided it is transparent for light.

Figure 21:
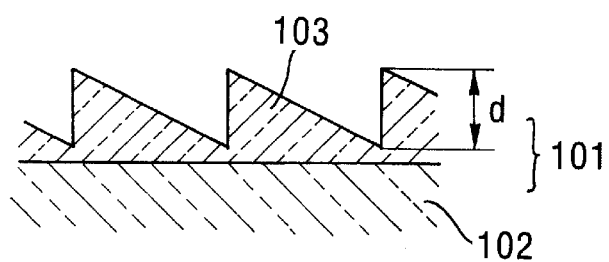
FIG. 21 is a fragmentary sectional view in enlarged scale of a diffractive optical element according to the invention.
Figure 22:
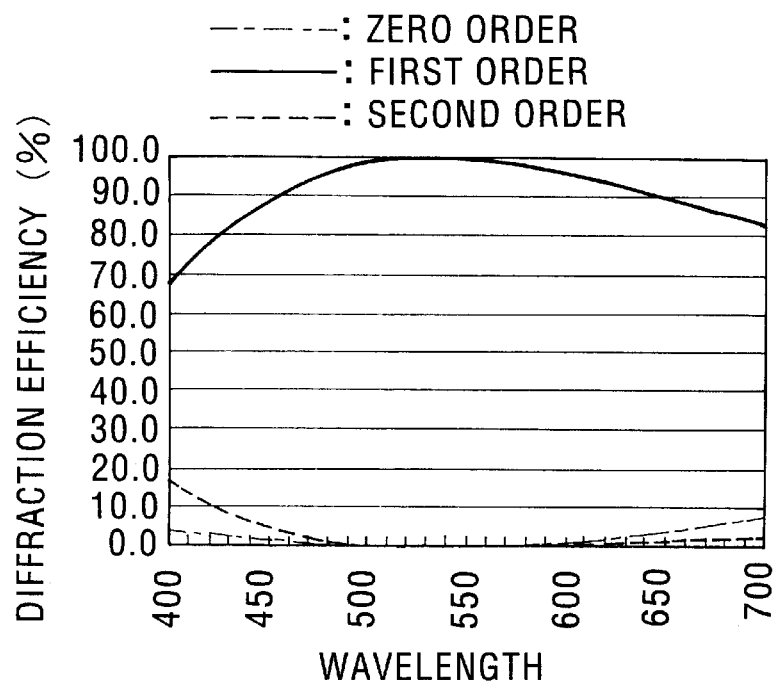
FIG. 22 is a graph of the wavelength-dependent characteristics of the diffractive optical element shown in FIG. 21.
Figure 23:
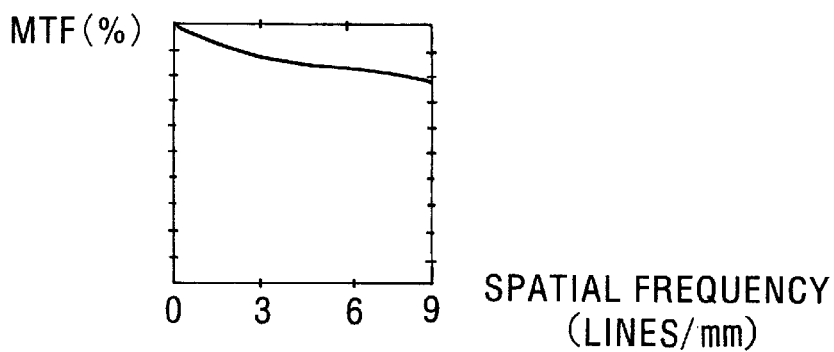
FIG. 23 is a graph of the MTF characteristic of the diffractive optical element shown in FIG. 21.
Figure 24:
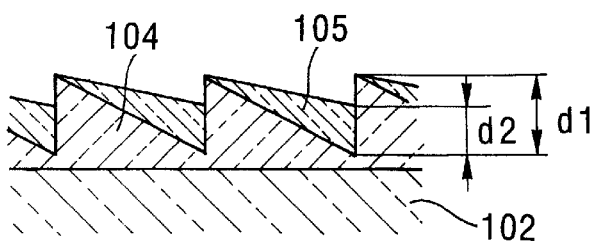
FIG. 24 is a fragmentary sectional view in an enlarged scale of another diffractive optical element according to the invention.
Figure 25:
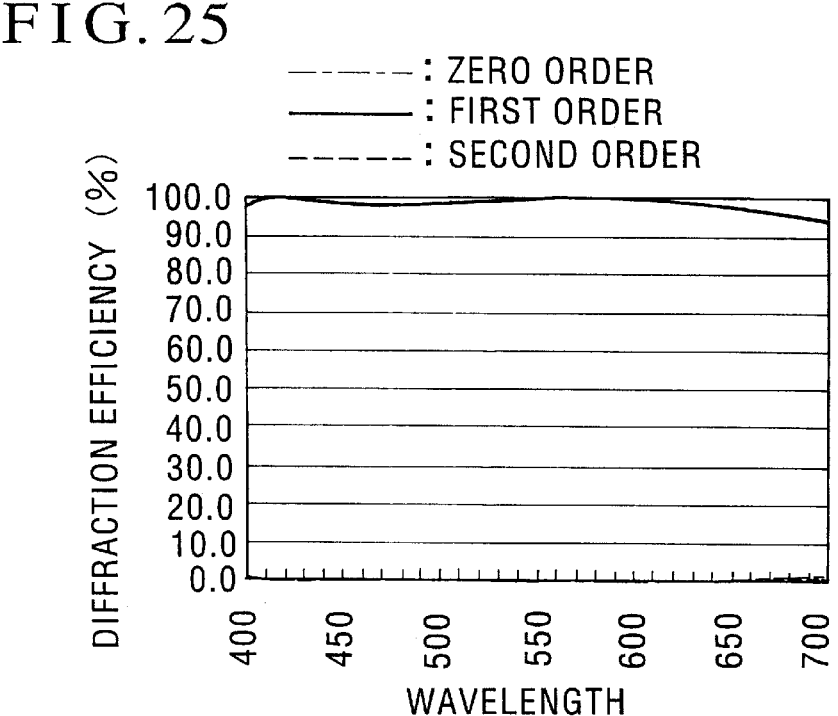
FIG. 25 is a graph of the wavelength-dependent characteristics of the diffractive optical element shown in FIG. 24.
Figure 26:
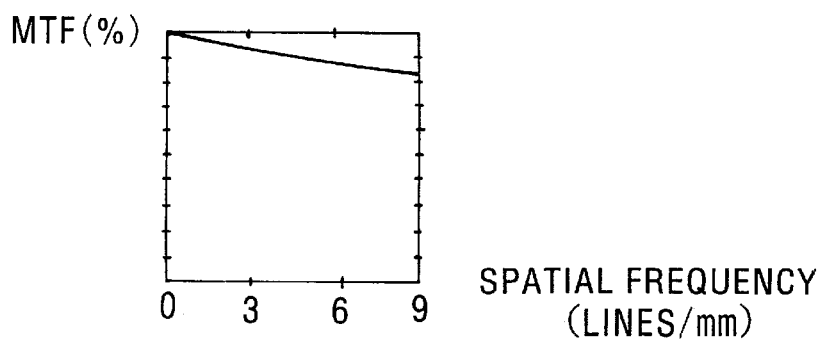
FIG. 26 is a graph of the MTF characteristic of the diffractive optical element shown in FIG. 24.

In the embodiment described above, the diffraction grating 101 of the diffractive optical element is of kinoform as shown in FIG. 21. FIG. 22 shows the wavelength-dependent characteristics of the diffraction efficiency in the first order of the diffractive optical element shown in FIG. 21. An actual example of the diffraction grating is constructed on a surface of a substrate 102 with a layer of ultra-violet ray setting resin applied thereon. A diffraction grating 103 is thus formed to such a thickness "d" that the diffraction efficiency in the first order becomes 100% at a wavelength of 530 µm. As is apparent from FIG. 22, the diffraction efficiency in the design order decreases as the wavelength goes away from the optimized one, or 530 µm. Meanwhile, in the neighborhood of the design order, that is, in the zero and second orders, the amount of diffracted rays increases. Such an increase of the diffracted rays in the orders other than the design order causes the production of flare and leads to lowering the resolving power of the optical system. In FIG. 23, there is shown the MTF (Modulation Transfer Function) characteristic with respect to the spatial frequency when the actual example described above is made up in the grating shape shown in FIG. 21. In this graph, it is understandable that the MTF characteristic drops from the desired value in the low frequency region. So, as another actual example, a laminated type of diffraction grating is shown in FIG. 24 as usable in the diffractive optical element embodying one form of the invention. FIG. 25 is the wavelength-dependent characteristics of the diffraction efficiency in the first order of the diffractive optical element in this form. To actually produce the laminated type of diffraction grating, a first diffraction grating 104 of an ultraviolet setting resin (Nd=1.499, vd=54) is formed on the substrate 102. As stacked on the first diffraction grating 104, a second diffraction grating 105 of another ultraviolet setting resin (Nd=1.598, vd=28) is formed. In such a combination of the materials, the thickness d1 of the first diffraction grating 104 is determined to be d1=13.8 µm and the thickness d2 of the second diffraction grating 105 is determined to be d2=10.5 µm. As is understandable from FIG. 25, the diffraction efficiency in the design order can be increased to higher than 95% over the entire range of useful wavelengths. The MTF characteristics with respect to the spatial frequency in this case is shown in FIG. 26. The use of the diffractive grating of the laminated type improves the MTF characteristics in the low frequency region. The desired MTF characteristics are thus obtained. It will be appreciated from the foregoing that, if, as the diffractive optical element, the laminated structure is used, further improvements of the optical performance can be achieved.

Figure 27:
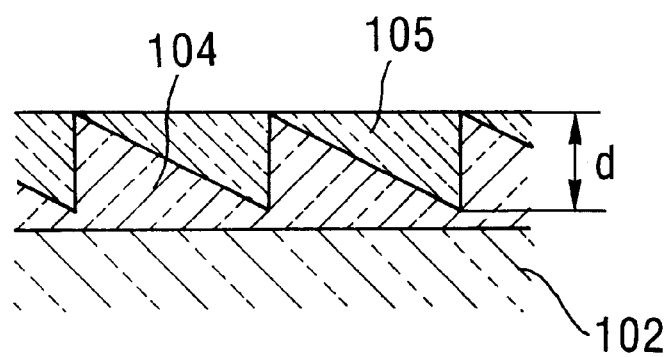
FIG. 27 is a fragmentary sectional view in an enlarged scale of a further diffractive optical element according to the invention.

Incidentally, for the diffractive optical element of the laminated structure described above, the materials are not limited to the ultraviolet setting resin. Other materials, such as plastics, also may be used instead. In some cases of the substrates, the first diffraction grating 104 may be formed directly on the substrate. Furthermore, there is no need to make the thicknesses of the two gratings different from each other. In some combinations of materials, the thicknesses of the two gratings may be made equal to each other as shown in FIG. 27. Since, in this case, no grooves are exposed to the outside from the surface of the diffractive optical element, the dust proof characteristic is excellent, contributing to an increase of the productivity on the assembling line in manufacturing the diffractive optical elements. Accordingly, more inexpensive optical systems can be produced.

What is claimed is:

1. An optical system comprising, in order from an object side to an image side, a first lens unit having a positive refractive power and a second lens unit having a negative refractive power, said second lens unit being moved during focusing, wherein said first lens unit has a diffractive portion having a positive refractive power, and a first lens subunit of a positive refractive power, and said first lens subunit comprises at least one positive lens and at least one negative lens, said optical system satisfying the following conditions:

$$0.005 < \phi_D/\phi_{1a} < 0.05$$

$$50 < v_{1ap} < 75$$

$$25 < v_{1an} < 60$$

where $\phi_D$ is a refractive power of an optical element having said diffractive portion having a positive refractive power in said first lens unit, $\phi_{1a}$ is a refractive power of said first lens subunit, $v_{1ap}$ is an Abbe number of a material of the positive lens included in said first lens subunit when there is only one positive lens in said first lens subunit, or a mean value of Abbe numbers of materials of positive lenses included in said first lens subunit when there is more than one positive lens in said first lens subunit, and $v_{1an}$ is an Abbe number of a material of the negative lens included in said first lens subunit when there is only one negative lens in said first lens subunit, or a mean value of Abbe numbers of materials of negative lenses included in said first lens subunit when there is more than one negative lens in said first lens subunit.

2. An optical system according to claim 1, further satisfying the following condition:

$$0.5 < \phi_{1a}/\phi < 5$$

where $\phi$ is a refractive power of the entirety of said optical system.

3. An optical system according to claim 1, wherein said second lens unit has one positive lens and one negative lens, said optical system further satisfying the following conditions:

$$-5 < \phi_2/\phi < -1$$

$$20 < v_{2p} < 30$$

$$30 < v_{2n} < 50$$

where

φ is a refractive power of the entirety of said optical system, $\phi_2$ is a refractive power of said second lens unit, $v_{2p}$ is an Abbe number of a material of said positive lens included in said second lens unit, and $v_{2n}$ is an Abbe number of a material of said negative lens included in said second lens unit.

4. An optical system according to claim 1, 2 or 3, wherein said first lens subunit consists of, in order from the object side to the image side, a positive lens, a positive lens and a negative lens.

5. An optical system according to claim 4, wherein said first lens unit has a negative lens of meniscus form concave toward the image side disposed on the image side of said first lens subunit.

6. An optical system comprising, in order from an object side to an image side, a first lens unit having a positive refractive power and a second lens unit having a negative refractive power, said second lens unit being moved toward the image side along an optical axis during focusing from an infinitely distant object to a closest object, wherein said first lens unit has a diffractive portion having a positive refractive power composed of a diffraction grating of revolution symmetry with respect to the optical axis and a first lens subunit of a positive refractive power, and said first lens subunit comprises at least one positive lens and at least one negative lens, said optical system satisfying the following conditions:

$$0.005 < \phi_D/\phi_{1a} < 0.05$$

$$50 < v_{1ap} < 75$$

$$25 < v_{1an} < 60$$

where $\phi_D$ is a refractive power of an optical element having said diffractive portion having a positive refractive power in said first lens unit, $\phi_{1a}$ is a refractive power of said first lens subunit, $v_{1ap}$ is an Abbe number of a material of the positive lens included in said first lens subunit when there is only one positive lens in said first lens subunit, or a mean value of Abbe numbers of materials of positive lenses included in said first lens subunit when there is more than one positive lens in said first lens subunit, and $v_{1an}$ is an Abbe number of a material of the negative lens included in said first lens subunit when there is only one negative lens in said first lens subunit, or a mean value of Abbe numbers of materials of negative lenses included in said first lens subunit when there is more than one negative lens in said first lens subunit.

7. An optical system according to claim 6, further satisfying the following condition:

$$0.5 < \phi_{1a}/\phi < 5$$

where φ is a refractive power of the entirety of said optical system.

8. An optical system according to claim 6, wherein said second lens unit has one positive lens and one negative lens, said optical system further satisfying the following conditions:

$$-5 < \phi_2/\phi < -1$$

$$20 < v_{2p} < 30$$

$$30 < v_{2n} < 50$$

where

φ is a refractive power of the entirety of said optical system, $\phi_2$ is a refractive power of said second lens unit, $v_{2p}$ is an Abbe number of a material of said positive lens included in said second lens unit, and $v_{2n}$ is an Abbe number of a material of said negative lens included in said second lens unit.

9. An optical system according to claim 6, 7 or 8, wherein said first lens subunit consists of, in order from the object side to the image side, a positive lens, a positive lens and a negative lens.

10. An optical system according to claim 9, wherein said first lens unit has a negative lens of meniscus form concave toward the image side disposed on the image side of said first lens subunit.

11. An optical system comprising, in order from an object side to an image side, a first lens unit having a positive refractive power and a second lens unit having a negative refractive power, wherein said first lens unit has a diffractive portion having a positive refractive power and a first lens subunit of positive refractive power, and said first lens subunit comprises at least one positive lens and at least one negative lens, said optical system satisfying the following conditions:

$$0.005 < \phi_D/\phi_{1a} < 0.05$$

$$v_{1ap} \neq v_{1an}$$

where $\phi_D$ is a refractive power of an optical element having said diffractive portion having a positive refractive power in said first lens unit, $\phi_{1a}$ is a refractive power of said first lens subunit, $v_{1ap}$ is an Abbe number of a material of the positive lens included in said first lens subunit when there is only one positive lens in said first lens subunit, or a mean value of Abbe numbers of materials of positive lenses included in said first lens subunit when there is more than one positive lens in said first lens subunit, and $v_{1an}$ is an Abbe number of a material of the negative lens included in said first lens subunit when there is only one negative lens in said first lens subunit, or a mean value of Abbe numbers of materials of negative lenses included in said first lens subunit when there is more than one negative lens in said first lens subunit.

12. A camera which picks up images by using an optical system according to any of claims 1–3, 6–8, and 11.

* * * * *

UNITED STATES PATENT AND TRADEMARK OFFICE
CERTIFICATE OF CORRECTION

PATENT NO. : 6,268,969 B1
DATED : July 31, 2001
INVENTOR(S) : Hideki Ogawa

It is certified that error appears in the above-identified patent and that said Letters Patent is hereby corrected as shown below:

Column 3,
Line 25, "the positive lens" should read -- the positive lens included in the first lens subunit when there is only one positive lens in the first lens subunit --.

Column 12,
Line 7, "stands the" should read -- stands for the --.

Signed and Sealed this

Twenty-third Day of April, 2002

Attest:

Attesting Officer

JAMES E. ROGAN
*Director of the United States Patent and Trademark Office*